United States Patent
Mizrah

(10) Patent No.: US 7,581,100 B2
(45) Date of Patent: Aug. 25, 2009

(54) KEY GENERATION METHOD FOR COMMUNICATION SESSION ENCRYPTION AND AUTHENTICATION SYSTEM

(75) Inventor: Len L. Mizrah, San Carlos, CA (US)

(73) Assignee: Authernative, Inc., Walnut Creek, CA (US)

( * ) Notice: Subject to any disclaimer, the term of this patent is extended or adjusted under 35 U.S.C. 154(b) by 830 days.

(21) Appl. No.: 10/653,503

(22) Filed: Sep. 2, 2003

(65) Prior Publication Data
US 2005/0050328 A1 Mar. 3, 2005

(51) Int. Cl.
H04L 9/32 (2006.01)
(52) U.S. Cl. .......................... 713/171; 380/47; 380/255
(58) Field of Classification Search ................ 713/164, 713/169, 150, 171; 380/277, 30; 726/5
See application file for complete search history.

(56) References Cited

U.S. PATENT DOCUMENTS

| | | | |
|---|---|---|---|
| 4,200,770 A | 4/1980 | Hellman et al. | |
| 5,241,599 A | 8/1993 | Bellovin et al. | |
| 5,434,918 A | 7/1995 | Kung et al. | |
| 5,636,280 A * | 6/1997 | Kelly | 713/155 |
| 5,841,871 A | 11/1998 | Pinkas | |
| 5,872,917 A | 2/1999 | Hellman | |
| 6,058,480 A | 5/2000 | Brown | |
| 6,076,163 A | 6/2000 | Hoffstein et al. | |
| 6,085,320 A | 7/2000 | Kaliski, Jr. | |
| 6,105,133 A | 8/2000 | Fielder et al. | |
| 6,161,185 A | 12/2000 | Guthrie et al. | |
| 6,170,058 B1 | 1/2001 | Kausik | |
| 6,189,098 B1 | 2/2001 | Kaliski, Jr. | |
| 6,199,113 B1 | 3/2001 | Alegre et al. | |
| 6,226,383 B1 | 5/2001 | Jablon | |
| 6,230,269 B1 | 5/2001 | Spies et al. | |
| 6,311,270 B1 * | 10/2001 | Challener et al. ........... | 713/169 |
| 6,363,480 B1 * | 3/2002 | Perlman ..................... | 713/164 |
| 6,367,010 B1 | 4/2002 | Venkatram et al. | |
| 6,377,691 B1 | 4/2002 | Swift et al. | |

(Continued)

OTHER PUBLICATIONS

Applied Cryptograpohy, by B. Schneier, ISBN: 0-471-11709-9. p. 53.*

(Continued)

Primary Examiner—Christian LaForgia
Assistant Examiner—Farid Homayounmehr
(74) Attorney, Agent, or Firm—Haynes Beffel & Wolfeld LLP

(57) ABSTRACT

An interactive mutual authentication protocol, which does not allow shared secrets to pass through untrusted communication media, integrates an encryption key management system into the authentication protocol. The server provides ephemeral encryption keys in response to a request during a Session Random Key (SRK) initiation interval. SRK is provided for all sessions initiated in the SRK initiation interval. A set of ephemeral intermediate Data Random Keys (DRK) is associated with each request. A message carrying the SRK is sent to the requestor. A response from the requester includes a shared parameter encrypted using the SRK verifying receipt of the SRK. After verifying receipt of the SRK at the requester, at least one message is sent by the server carrying an encrypted version of one of said set of ephemeral intermediate DRK to be accepted as an encryption key for the session.

14 Claims, 10 Drawing Sheets

U.S. PATENT DOCUMENTS

| | | | |
|---|---|---|---|
| 6,393,127 | B2 | 5/2002 | Vogler |
| 6,487,667 | B1 | 11/2002 | Brown |
| 6,490,352 | B1 * | 12/2002 | Schroeppel ................ 380/30 |
| 7,181,620 | B1 * | 2/2007 | Hur ........................... 713/171 |
| 2002/0095507 | A1 | 7/2002 | Jerdonek |
| 2003/0185391 | A1 * | 10/2003 | Qi et al. ....................... 380/44 |

OTHER PUBLICATIONS

Bellovin, Steven M., et al., "Limitations of the Kerberos Authentication System," USENIX, Winter 1991, Dallas, Texas, 1-16 (A version of this paper was published in Oct. 1990 in Computer Communications Review).

Diffie, Whitfield, et al., "New Directions in Cryptography," IEEE Transactions on Information Theory, vol. IT-22, No. 6, Nov. 1976, 644-654.

Federal Information Processing Standards Publication (FIPS) 46-3, "Data Encryption Standard (DES)," Oct. 25, 1999, 18 pages.

Federal Information Processing Standards Publication (FIPS) 180-1, "Secure Hash Standard," Apr. 17, 1995, 18 pages.

Noakes-Fry, Kristen, "Public-Key Infrastructure: Technology Overview," DPRO-90693, Gartner Technology Overview, May 20, 2003, 18 pages.

Park, Stephen K., et al., "Random Number Generators: Good Ones are Hard to Find," Communications of the ACM 31(10), Oct. 1988, 1192-1201.

Wheatman, V., "Public-Key Infrastructure Q&A," Gartner Research Note, Nov. 13, 2002, 5 pages.

Pescatore, John, "Another Microsoft Security Flaw Threatens Users' Trust," FT-17-8896, Gartner FirstTake, Aug. 15, 2002, 2 pages.

Pescatore, J., et al., "Secure Sockets Layer Sometimes Isn't," Gartner Research Note, Apr. 3, 2002, 4 pages.

Rivest, R., RFC 1320, "The MD4 Message-Digest Algorithm," MIT Laboratory for Computer Science and RSA Data Security, Inc., Apr. 1992, 20 pages.

Rivest, R., RFC 1321, "The MD5 Message-Digest Algorithm," MIT Laboratory for Computer Science and RSA Data Security, Inc., Apr. 1992, 22 pages.

Lloyd, B, et al., RFC 1334, "PPP Authentication Protocols," L&A and Daydreamer, Oct. 1992, 14 pages.

Kohl, J., et al., RFC 1510, "The Kerberos Network Authentication Service (V5)," Digital Equipment Corporation and ISI, Sep. 1993, 97 pages.

Schneier, Bruce, "Applied Cryptography," Second Ed. John Wiley and Sons, Inc. (1996), 233-560.

Smith, K., RFC 1934, "Ascend's Multilink Protocol Plus (MP+)," Ascend Communications, Apr. 1996, 37 pages.

Fielding, R., et al., RFC 2068, "Hypertext Transfer Protocol —HTTP/1.1," UC Irvine, DEC, MIT/LCS, Jan. 1997, 134 pages.

Zorn, G., RFC 2759, "Microsoft PPP CHAP Extensions, Version 2," Microsoft Corporation, Jan. 2000, 16 pages.

* cited by examiner

MESSAGE ENCRYPT/DECRYPT ITERATIVE AUTHENTICATION (MEDIA) PROTOCOL
(Client - Server Architecture; Password Based Mutual Authentication; Part A - SERVER SIDE)

| # | SERVER | SENT | RECEIVED | E-KEY | D-KEY | ByteVU CA, SECTIONS, BYTES | SRNG SEED | C-LINE |
|---|---|---|---|---|---|---|---|---|
| 1 | www s | | c connection request | | | no | | to SERVER |
| 2 | servlets | SRK (compiled) | | | | no | | to CLIENT |
| 3 | dB/servlets | | h-u-name | | SRK | no | | to SERVER |
| 4 | dB/servlets | DRK1 | | SRK | | yes, 16, 25 | h-u-password | to CLIENT |
| 5 | dB/servlets | | h-DRK1 | | DRK1 | yes, 16, 25 | h-u-password | to SERVER |
| 5A | dB/servlets | no | | SRK | | no | | to CLIENT |
| 6 | dB/servlets | DRK2 | | DRK1 | | yes, 16, 25 | h-u-password | to CLIENT |
| 7 | dB/servlets | | h-DRK2 | | DRK2 | yes, 16, 25 | h-u-password | to SERVER |
| 8 | dB/servlets | DRK2 | | DRK2 | | yes, 16, 25 | h-s-password | to CLIENT |
| 9 | dB/servlets | | h-DRK2 | | DRK2 | yes, 16, 25 | h-s-password | to SERVER |
| 10 | dB/servlets | go/no | | DRK1 | | yes, 16, 25 | h-u-password | to CLIENT |

Legends: SRNG - Sequential Random Number Generator,
SRK (DRK) - Session (Data) Random Symmetric Encryption Key, ByteVU - "Byte-Veil-Unveil" Algorithm,
E - ENCRYPTION, D - DECRYPTION, C - COMMUNICATION, u - user, h - hashed, p - protected
c - Client, s - Server, dB - Database, CA - ByteVU Conversion Array

FIG. 8A

MESSAGE ENCRYPT/DECRYPT ITERATIVE AUTHENICATION (MEDIA) PROTOCOL
(Client - Server Architecture; Password Based Mutual Authentication; Part B - CLIENT SIDE)

| C-LINE | SRNG SEED | ByteVU CA, SECTIONS, BYTES | D-KEY | E-KEY | ENTERED BY CLIENT | RECEIVED | SENT | CLIENT | # |
|---|---|---|---|---|---|---|---|---|---|
| to SERVER | | no | | | | | p-link / URL | WAN/LAN | 1 |
| to CLIENT | | no | | | | GUI, SRK (compiled) | | applet logic | 2 |
| to SERVER | | no | | SRK | u-name, s- & u-passwords | | h-u-name | applet GUI | 3 |
| to CLIENT | h-u-password | yes, 16, 25 | SRK | | | DRK1 | | applet logic | 4 |
| to SERVER | h-u-password | yes, 16, 25 | | DRK1 | | | h-DRK1 | applet logic | 5 |
| to CLIENT | | no | SRK | | | error message | | applet GUI | 5A |
| to CLIENT | h-u-password | yes, 16, 25 | DRK1 | | | DRK2 | | applet logic | 6 |
| to SERVER | h-u-password | yes, 16, 25 | | DRK2 | | | h-DRK2 | applet logic | 7 |
| to CLIENT | h-s-password | yes, 16, 25 | DRK2 | | | h-DRK2 | | applet logic | 8 |
| to SERVER | h-s-password | yes, 16, 25 | | DRK2 | | | h-DRK2 | applet logic | 9 |
| to CLIENT | h-u-password | yes, 16, 25 | DRK1 | | | go/no | | applet GUI | 10 |

Legends: SRNG - Sequential Random Number Generator,
SRK (DRK) - Session (Data) Random Symmetric Encryption Key, ByteVU - "Byte-Veil-Unveil" Algorithm,
E - ENCRYPTION, D - DECRYPTION, C - COMMUNICATION, u - user, h - hashed, p - protected
c - Client, s - Server, CA - ByteVU Conversion Array

FIG. 8B

KEY GENERATION METHOD FOR COMMUNICATION SESSION ENCRYPTION AND AUTHENTICATION SYSTEM

REFERENCE TO RELATED APPLICATIONS

The present application is related to U.S. patent application Ser. No. 10/653,506, entitled COMMUNICATION SESSION ENCRYPTION AND AUTHENTICATION SYSTEM, invented by Mizrah, and filed on the same day as the present application.

The present application is related to U.S. patent application Ser. No. 10/653,500, entitled KEY CONVERSION METHOD FOR COMMUNICATION SESSION ENCRYPTION AND AUTHENTICATION SYSTEM, invented by Mizrah, and filed on the same day as the present application.

BACKGROUND OF THE INVENTION

1. Field of the Invention

The invention relates generally to security of authentication and data transmission over untrusted communication media in client-server computer, network, and other architectures, and more particularly to encryption key management systems and authentication protocols.

2. Description of the Related Art

Electronic networks of interconnected devices and users continue to grow with unprecedented rate. They have become foundations for vitally important infrastructures enabling e-commerce, communications, corporate and government operations, healthcare, education, and other important areas. This phenomenon was actively studied and commercialized during the last quarter of the $20^{th}$ century, and there is every indication this activity will intensify well into the $21^{st}$ century.

There are various parties involved in remote relationships over distributed electronic networks. Most known representations are business-to-business (b2b), business-to-consumers (b2c), and peer-to-peer (p2p), describing scaled-down to hardware devices communication, for instance, peer router to peer router, or device-to-device (d2d). One of the fundamental problems for continued growth of electronic networks and their efficient utilization is establishing trust between remote counterparts in b2b, b2c, d2d, and other interrelating over network parties. It is common knowledge that computer network intruders (or intruding organizations) cause ever-growing direct economic losses to enterprises and individual consumers. They significantly undermine the progress in applying network technologies to certain areas, especially related to parties having legal and financial responsibilities, and national security.

Trust to remote humans or devices, interacting over electronic networks, has two components. The first component is identification and verification of the parties at the beginning of the communication session (mutual authentication). The second component is associated with trust to information transferred during the communication session over untrusted communication media (communication lines). It includes the following specific requirements—confidentiality (none can read the message except the intended recipient), integrity (none altered, tampered with, or modified the message against the original), and non-repudiation (the sender cannot deny the fact of having sent the message).

Authentication and cryptography are key enabling technologies employed to satisfy the security requirements listed above. Authentication factors are typically characterized as "what user knows" (for instance, passwords, PINs), "what user has" (for instance, hardware token, smart card), and "what user is" (particular biometric traits; for instance, fingerprints, voice patterns, etc.). Passwords are the most ubiquitous over electronic networks as an authentication factor due to ease of use, low cost and easy electronic deployment. Most of the strong (two-, or three-factor) authentication systems are still using passwords or PINs as one of the system authentication factors.

However, passwords provide low security due to insufficient protection against numerous known intruding attacks on databases where the passwords are residing, social engineering attacks, videotaping or "shoulder surfing" attacks during password entry stages, memory sniffing attacks, Trojan horse attacks, and network sniffing attacks. Perhaps, the latter are the most dangerous attacks as a distributed electronic network (like Internet) has numerous access points. There are authentication systems transmitting passwords in clear text (for instance, Password Authentication Protocol (PAP) RFC 1334-2, Telnet, and FTP). Certainly, there is no protection at all in such cases. More protected authentication systems transmit encrypted passwords over electronic networks.

There are several approaches in transferring an encrypted password. The first one is based on the one-way encryption—calculating the password's hash value with one of the standard hashing algorithms (for example, SHA-1 Secure Hash Algorithm, FIPS PUB 180-1, Secure Hash Standard, 1995, Apr. 17, or MD5 Message Digest Algorithms, RFC 1320 and RFC 1321, April 1992, by Ronald L. Rivest) at both client and server locations. The client transmits the hashed password (of the user at the client platform) to the server, where it is compared with the password of the same client (the same user at the client platform) from the database connected to the server (typically, user passwords are already stored in password files in hashed form for database protection; that is why there is no need to perform text-to-hash encryption operation). Unfortunately, the progress in integrated circuit (ASIC, FPGA, etc.) design and manufacturing drastically reduced protection of hashed passwords, as dictionary or brute force computer processing attacks became extremely efficient. It is worthy to note that sometimes intercepting a hashed password is sufficient enough to break the system without learning the actual password.

There are more sophisticated authentication systems based on Challenge-Handshake Authentication Protocol (CHAP, for instance, RFC 1334-3, RFC 1934, RFC 2759) used by Microsoft for Windows NT remote log-in. The server (the authenticator) sends the "challenge" to the client (the peer), where the message gets encrypted using the client's (the peer's) password. Actually, the "challenge" sent to the client platform is then encrypted at the client location three times using the first seven bytes of the password's hash value as the first DES key (Data Encryption Standard and other known encryption algorithms used for data encryption and decryption described in Bruce Schneier, Applied Cryptography, Second Edition, John Wiley and Sons, Inc., at pp. 233-560, (1996)); the next seven bytes of the password's hash value used as the second DES key, and the remaining two bytes of the password's hash value concatenated with five zero-filled bytes used as a third DES key. Eventually, three 64-bit "responses" (the "challenge" encrypted with DES keys as described above) are sent back to the server (the authenticator), where they are compared with the similar outputs calculated at the server. If the values match, the authentication is acknowledged; otherwise the connection should be terminated.

Passwords (client/server shared secrets) in CHAP never enter communication lines in either form. This is a serious security advantage of this protocol. Also, CHAP prevents playback attacks by using "challenges" of a variable value.

The server (the authenticator) is in control of the frequency and timing of the "challenge". CHAP assumes that passwords are already known to the client and the server, and are easily accessible during a CHAP session. However, frequent usage of the same static encryption keys derived from a password on the client host, and applied to encrypt even random "challenge" numbers sent in clear text to the client, raises some security concerns. It provides ample opportunities for intruders, sniffing the network with the following offline computer data processing attacks.

Various modifications of client/server authentication employing a challenge/response protocol are disclosed in Bellovin et al., U.S. Pat. No. 5,241,599, Kung et al., U.S. Pat. No. 5,434,918, Pinkas, U.S. Pat. No. 5,841,871, Hellman, U.S. Pat. No. 5,872,917, Brown, U.S. Pat. No. 6,058,480, Hoffstein at al., U.S. Pat. No. 6,076,163, Guthrie et al., U.S. Pat. No. 6,161,185, Jablon, U.S. Pat. No. 6,226,383, Swift et al., U.S. Pat. No. 6,377,691, Brown, U.S. Pat. No. 6,487,667, Jerdonek, U.S. Pub. No. 2002/0095507. Some of these patents go beyond security of just only an authentication process. They explore the opportunity of utilizing challenge/response type protocols as a basis for an encryption key management system. This can extend security for the entire communication session duration, allowing for encrypted data transmission between parties once their mutual authentication is completed.

U.S. Pat. No. 5,434,918 and U.S. Pat. No. 6,377,691 applied client/server authentication based on different modifications of a challenge/response protocol to exchange secret keys (symmetric cryptography) between parties. There were attempts combining challenge/response protocols with well-known encryption key management systems. For instance, U.S. Pat. No. 6,076,163 and U.S. Pub. No. 2002/0095507 disclose versions of a challenge/response protocol utilizing an authentication and encryption key management system based on PKI (Public Key Infrastructure (Hellman et al., U.S. Pat. No. 4,200,770, and Diffie at al., IEEE Transactions on Information Theory, vol. IT-22, No. 6, Nov. 1976)), whereas U.S. Pat. No. 5,841,871 discloses a version of a challenge/response protocol integrated with Kerberos (NET, 1988; RFC 1510))—the authentication and encryption key management system.

Another approach would be encrypting passwords (either text or hash) with a secret key (symmetric cryptography) on the client side, before transmission, and then, decrypt it on the server side for comparison with the password stored in the server-connected database. Though it can be a viable solution, there are several security requirements making this approach a very difficult one to implement. The first issue is how to manage the session secret key distribution between the client and the server. Otherwise, if the secret keys are statically preset at the client and the server hosts, they become a security concern by themselves. Moreover, having static keys for numerous communication sessions makes encrypted passwords vulnerable against offline computer data processing attacks. There are protocols, not based on a challenge/response type mechanism, where authentication credentials are distributed over communication lines with help of PKI. They were disclosed in Kaliski, U.S. Pat. No. 6,085,320, Kausik, U.S. Pat. No. 6,170,058, Kaliski, U.S. Pat. No. 6,189,098, Spies, U.S. Pat. No. 6,230,269 and Volger, U.S. Pat. No. 6,393,127. Despite recognized scientific studies and long-time exposure, PKI and Kerberos authentication and encryption key management systems have not experienced a wide industry acceptance due to their complexity, cost, and mandatory requirements to trust artificial third parties (see, for instance, Gartner QA-18-7301, 13 Nov., 2002, by V. Wheatman, Public-Key Infrastructure Q&A, and DPRO-90693, 20 May, 2003, by Kristen Noakes-Fry, Public Key Infrastructure: Technology Overview; USENIX, 91, Dallas, Tex., "Limitations of the Kerberos Authentication System", by Steven M. Bellovin and Michael Merritt). SSL (Secure Socket Layer, based on PKI protocol developed by Netscape Communications in 1994) is also known for its security deficiencies, high cost and complexity in assuring "client browser"/"Web server" encrypted communication (see, for instance, Gartner T-16-0632, 3 Apr., 2002, by J. Pescatore and V. Wheatman, and FT-178896, 15 Aug., 2002, by J. Pescatore). Hence, there is a significant interest in exploring other encryption key management systems, similar to the challenge/response authentication protocols mentioned above, for instance, Fielder, U.S. Pat. No. 6,105,133, Alegre, U.S. Pat. No. 6,199,113, and Venkatram, U.S. Pat. No. 6,367,010.

Aspects of this invention are particularly concerned with security of authentication systems and encrypted information exchange over distributed computer networks. Prior art encrypted authentication protocol implementations based on PKI, SSL, and Kerberos exhibited numerous security flaws and a prohibitive level of complexity and cost for various applications, businesses and organizations. There is a substantial need for improved and more efficient encrypted authentication protocols, addressing less complex infrastructures required, and less costly for practical implementation encryption key management systems. These improved encrypted authentication protocols should also include secure mutual authentication built into the protocols; randomly generated session secret keys; new cryptographic algorithms allowing for scalable security authentication and data encryption, and further allowing for variation based on the power of computer and network resources.

SUMMARY OF THE INVENTION

In accordance with the present invention, there are two secrets uniquely shared by either client/server pair, or authenticator/peer pair, and required for their mutual authentication. In the preferred embodiments, both secrets will suffice for a "what user knows" type authentication factor and either could be in a form of passwords or PINs, though other types of shared secrets can be used. Like other challenge/response type authentication protocols, where shared secrets are never in transit over communication lines, the protocol of the present invention does not allow shared secrets to pass through untrusted communication media. In order to avoid transmission of the shared secrets, a new encryption key management system has been integrated into the authentication protocol, becoming an essential part of the protocol itself.

The main function of this encryption key management system is a secure distribution within either client/server pair, or authenticator/peer pair of a secret session random key (the same secret key is used in symmetric cryptography to encrypt and then decrypt digital information). Successful exchange of this encryption key enables secure resolution of two fundamental tasks. First, it allows for secure transit of the protocol data over communication lines in encrypted form, permitting explicit mutual authentication of the connected parties. Second, the post-authentication stage of the communication session can use secure encryption for the data exchange, since each party has already obtained the secret session random key.

A series of new algorithms has been developed in the present invention and built into the new encryption key management system mentioned above. There is an algorithm (Time Interplay Limited Session Random Key (SRK) Algorithm (TILSA)) for generating and eventually obliterating arrays of session secret random keys. It starts long before the session begins and keeps processing these arrays during each communication session and well beyond it. At the same time, this algorithm allows concurrent communication between a number of client/server or authenticator/peer pairs with the same keys in the generated arrays (the multi-threading technology).

Another algorithm (Key Encryption/Decryption Iterative Algorithm (KEDIA)) is initialized, provided there is a request for connection. It initiates an iterative sequence of messages from the server to the client and back to the server, each containing a consecutive session secret random key, encrypted with the session secret random key preceding the encrypted one in the array, and sent to the client in the previous message. The client can decrypt any following message and obtain an intermediate session secret random key from the array, provided the client could decrypt the previous message. The iterations continue until client/server (or authenticator/peer) mutual authentication is completed, and the Final Secret Key (FSK) is exchanged between the parties. More particularly, client/server (or authenticator/peer) authentication credentials and FSK eventual high security are achieved by applying, during each cycle of key encryption at the server (and its decryption at the client platform), either of Byte-Veil-Unveil (ByteVU), Bit-Veil-Unveil (BitVU), or Byte-Bit-Veil-Unveil (BBVU) algorithms. Each of these algorithms disassembles message bytes, or bits, or both bytes and bits in combination, together at the server and reassemble them at the client according to a certain procedure, which is started with the pair's shared secret. In other words, the client/server or authenticator/peer pair employs their shared secret to first build the session "security bridge" over the untrusted communication medium until "the bridge" is believed secure enough. Then, the authentication credentials can be safely tested with ByteVU, BitVU, or BBVU algorithms at the respective counterparts for the final mutual authentication, enabling the communication session. Otherwise, if the mutual authentication is not completed, the communication session is terminated.

In one aspect of the invention, the client/server authentication protocol (Message Encrypt/Decrypt Iterative Authentication (MEDIA) protocol, which includes the encryption key management system described above), is highly resilient against session eavesdropping attacks, replay attacks, man-in-the-middle attacks, online and offline computer-processing attacks (like a dictionary attack or a brute force attack), and session hijacking attacks. Inability to successfully complete the MEDIA protocol can be regarded as intrusion detection (if there are more than just a few failed attempts from the same client caused by mistyping the entry data by a user on the client platform, or inaccurately set up hardware authentication credentials).

In another aspect of the invention, the MEDIA protocol ends up with a FSK secret key, which can be used beyond the client/server authentication protocol stage of the communication session for encrypting data in transit and decrypting it upon arrival either to the server, or to the client. Security of FSK, and authentication credentials (client/server shared secrets) are guarded by five security tiers of the MEDIA authentication protocol and can be scaled with the client and server platforms' CPU power and the network throughput. In order to enhance security, FSK, as well as the entire series of preceding FSK session iterative random secret keys of the MEDIA protocol, are never transmitted over untrusted electronic communication media in their original form, or as their hash equivalents.

In yet another aspect of the invention, the MEDIA protocol contains the encryption key management system, integrated into the protocol, represented by TILSA, KEDIA and ByteVU, BitVU, or BBVU algorithms. Their collective utilization assures randomly generated arrays of session secret keys, having limited life time and enabling efficient key encrypt/decrypt iterative messaging procedures, employing for each instance of iteration (each message encrypted on the server and decrypted on the client) a shared secret (password, PIN, or pattern) known only to the client and to the server. Moreover, the shared secrets (for instance, client and server passwords) are never transmitted over untrusted communication media in any form.

In still another aspect of the invention, the five security tiers of the MEDIA protocol provide for a message confidentiality (no one can read messages; this is increasingly true with the increased number of SRK in the TILSA and the number of message iterations in the KEDIA). Message integrity is preserved because, if an intruder altered or in some way tampered with the message in the conversion array, potentially available to an intruder while it is in transit on communication lines, then it will be impossible for ByteVU, BitVU, or BBVU algorithms to reassemble the encrypted keys or authentication credentials, either at the client or at the server. Message non-repudiation is guaranteed by the mutual authentication mechanism (the fifth security tier)—without exception only the client and the server know their shared secrets and respectively could send a message.

In a further aspect of the invention, the post-authentication part of the MEDIA session continued with FSK can also employ such message integrity control technique as encrypting with FSK the message hash, before the message is encrypted with FSK. Then the message hash can be decrypted with FSK on the receiving end, and compared with the same message, hashing it after having the message decrypted with FSK.

BRIEF DESCRIPTION OF THE DRAWINGS

Additional objects, features, capabilities and advantages of the present invention will be apparent from the following detailed description when read in conjunction with the accompanying drawings in which:

FIG. 8A is the Message Encrypt/Decrypt Iterative Authentication (MEDIA) protocol (the server side) according to the present invention.

FIG. 8B is the Message Encrypt/Decrypt Iterative Authentication (MEDIA) protocol (the client side) according to the present invention.

DETAILED DESCRIPTION

According to the present invention, there are shared secrets (several secrets are needed in strong authentication cases and also in a case of mutual authentication) between two parties attempting to establish trust over untrusted electronic communication media. Shared secrets are usually established during an account open procedure. Though the server password could be shared by the plurality of users, it is assumed, without sacrificing any generality of the disclosed authentication protocol, that the preferred embodiment of this invention is to provide a unique server password for each user. Account set/reset online automated utilities would greatly facilitate establishing uniquely personalized server and user passwords. Client/server or d2d (authenticator/peer) communication sessions would be typical cases, though the client/server protocol would remain the preferred embodiment. There are no limitations on the nature of the shared secrets used. They could be "what user knows" secrets, for example, passwords, or "what user has" secrets, i.e., tokens and smart cards, or, alternatively, "what user is" secrets, for example, biometrics. However, the preferred embodiments would relate to secrets in the category of "what user knows". Also, there are no limitations on the network layer over which the authentication protocol is established—it could be TCP/IP stack, IPsec, or other communication protocols. Nevertheless, the preferred embodiments will assume HTTP (RFC 2068 Hypertext Transfer Protocol—HTTP/1.1 January 1997). Also, the invention implies contemporary object-oriented software technologies like Java, C++, and NET, providing multi-threading, serialization, servlet and applet techniques, library of cryptographic algorithms, GUI (Graphical User Interface) capabilities, and connectors/drivers like JDBC to standard commercial databases.

Figure 1:
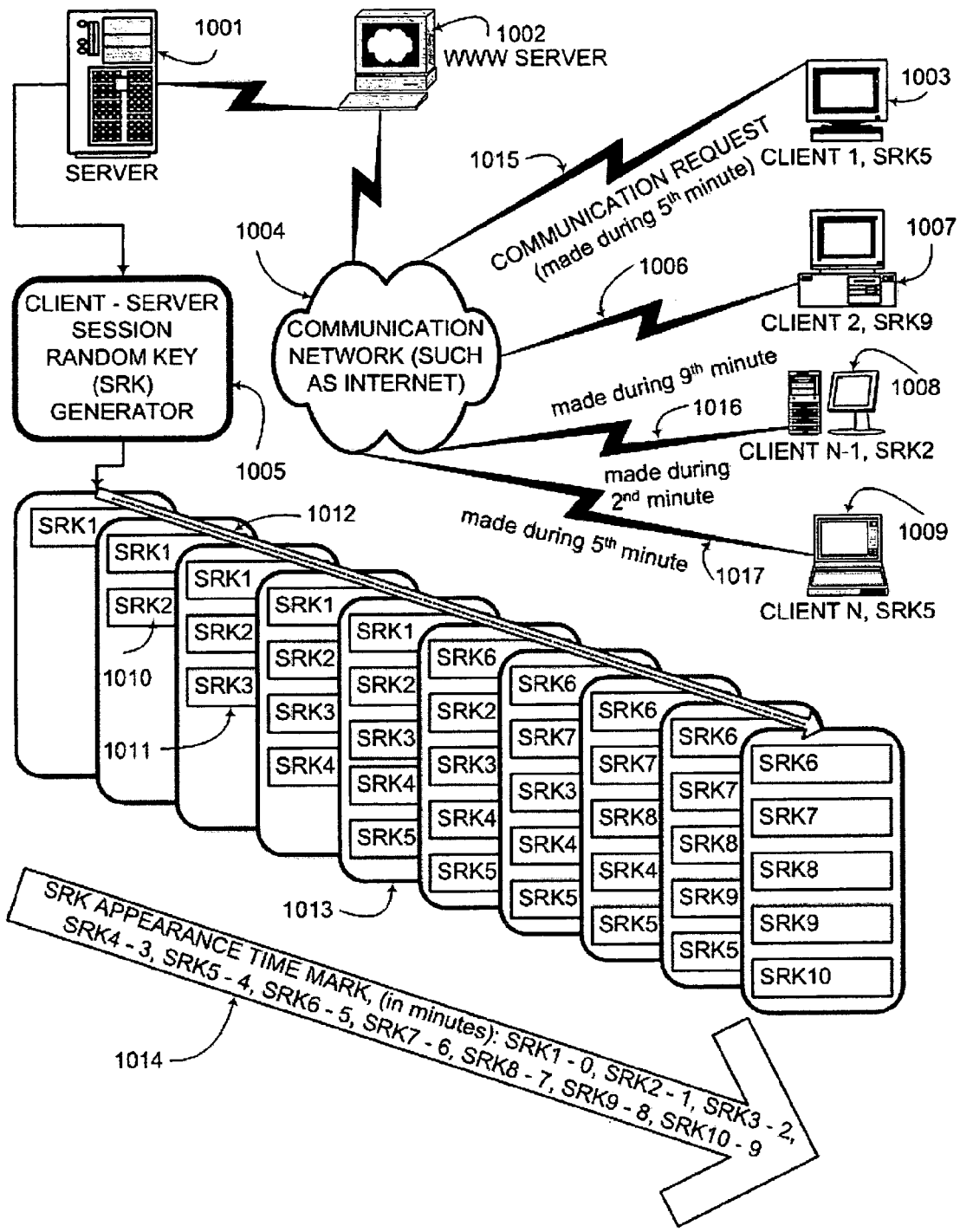
FIG. 1 is a graphic illustration of the Time Interplay Limited SRK (Session Random Key) Algorithm (TILSA) according to the present invention.

FIG. 1 is a graphic illustration of the Time Interplay Limited SRK (Session Random Key) Algorithm (TILSA) according to the present invention. Before any communication session starts, the server-placed logic continuously and periodically generates (Session Random Key Generator 1005) an array (Array of Session Keys (ASK) 1013) of Session Random Keys (SRK) 1011—secret keys (symmetric cryptography). Each key has two different lifetimes. The first lifetime (LT1) is the lifetime for establishing a client/server communication session, provided there is a request from a client or plurality of clients (Client 1 1003, Client 2 1007, . . . , Client N-1 1008, and Client N 1009) during LT1 to initiate a communication session. Each client can establish a communication link 1015, 1006, . . . , 1016, 1017 to Web Server 1002 and Compute/Applications Server 1001 through communication network 1004. The beginning of LT1 1014 is synchronized with each SRK 1011 generation, placing it into ASK 1013.

For instance, in FIG. 1, SRK1 appears in ASK 1013 at the time mark "0 minute", and at the moment that time mark 1 minute LT1 of SRK1 has expired, though SRK1 remains inside ASK 1013. SRK Generator 1005 at this moment generates SRK2 and places it into ASK 1013. By the time mark 2 minutes SRK2 LT1 has expired, even though SRK2 remains inside ASK 1013. Again, at this time SRK Generator 1005 generates and places into ASK 1013 SRK3, which LT1 becomes expired at the 3 minutes mark. This procedure is periodically repeated as long as SRK Generator 1005 is on. Client 1 1003 and Client N 1009 made a connection request during the time interval between time mark 4 minutes and time mark 5 minutes, since SRK Generator 1005 began generating SRK 1011 and filling them into ASK 1013. The only SRK 1011 not yet expired LT1 in ASK 1013 during this time interval is SRK5. Therefore, SRK5 is used to establish communication sessions with these clients. Similarly, Client 2 requested a communication session between time mark 8 minutes and time mark 9 minutes, whereas Client N-1 requested a communication session between time mark 1 minute and 2 minutes. Hence, the SRK 1011 used to establish these communication sessions are, respectively, SRK9 and SRK2.

Once LT1 is expired, the server generates and places into ASK 1013 another SRK 1012, which LT1 is just started. SRK1011 second life time LT2 defines the life time inside the limited size ASK 1013. The maximum size of ASK 1013 can be characterized with the parameter Nmax which indicates maximum number of SRK 1011 in ASK 1013 possible (for instance, Nmax=5 in FIG. 1). Typically, LT1<LT2, and in the most preferred embodiment LT1 can be derived as LT1=LT2/Nmax. Without sacrificing any generality limitations of TILSA, LT2 was chosen, for example, to be equal to 5 minutes in FIG. 1. Then, LT1 according to the formulae presented above, is equal to 1 minute. After LT1 expired, for any given SRK 1011, the key has LT2-LT1 time remaining to support communication session threads having been initiated during LT1. Once LT2 expired, SRK 1011 is removed from ASK 1013, effectively canceling any further participation of this particular SRK 1011 in the parties' communication session engagements. Certainly, each SRK 1011 can be used to originate multiple threads of communication sessions with each Session Elapsed Time (SET) less or equal to LT2-LT1. However, SET=LT2-LT1 is the preferred embodiment. Without sacrificing any generality limitations of TILSA, SET=4 minutes in FIG. 1. Taking SRK5 in FIG. 1 as an example of any SRK 1011 genesis, one can note that SRK5 is the last key to fulfill ASK 1013 to its maximum size Nmax=5, and SRK5 appears inside ASK 1013 at the 4-minute mark, since SRK Generator 1005 began generating SRK 1011 and filling them into ASK 1013. Then, during SRK5 LT1=1 minute, the key can be engaged into initiating multiple communication session threads with the clients requesting connections. From time mark 5 minutes, and until time mark 9 minutes, SRK5, in accordance with SET=4 minutes, is kept inside ASK 1013 available to support communication session threads started during SRK5 LT1. During this particular time interval, from time mark 5 minutes to time mark 9 minutes, SRK1, SRK2, SRK3, and SRK4 in ASK 1013 are being gradually replaced every minute by SRK6, SRK7, SRK8, and SRK9, respectively. Eventually, at time mark 9 minutes SRK5 is canceled, ultimately being replaced by SRK10.

This Time Interplay Limited SRK Algorithm (TILSA) is the first security tier of the authentication protocol, assuring supply of SRK 1011 to initiate any client/server communication session. However, the time to initiate a session (approximately one minute, without sacrificing any generality limitations of TILSA) and the time to continue the session authentication protocol (possibly several minutes, without sacrificing any generality limitation of TILSA) are quite limited for any given SRK 1011, thus hindering a possible intruding activity.

Figure 2:
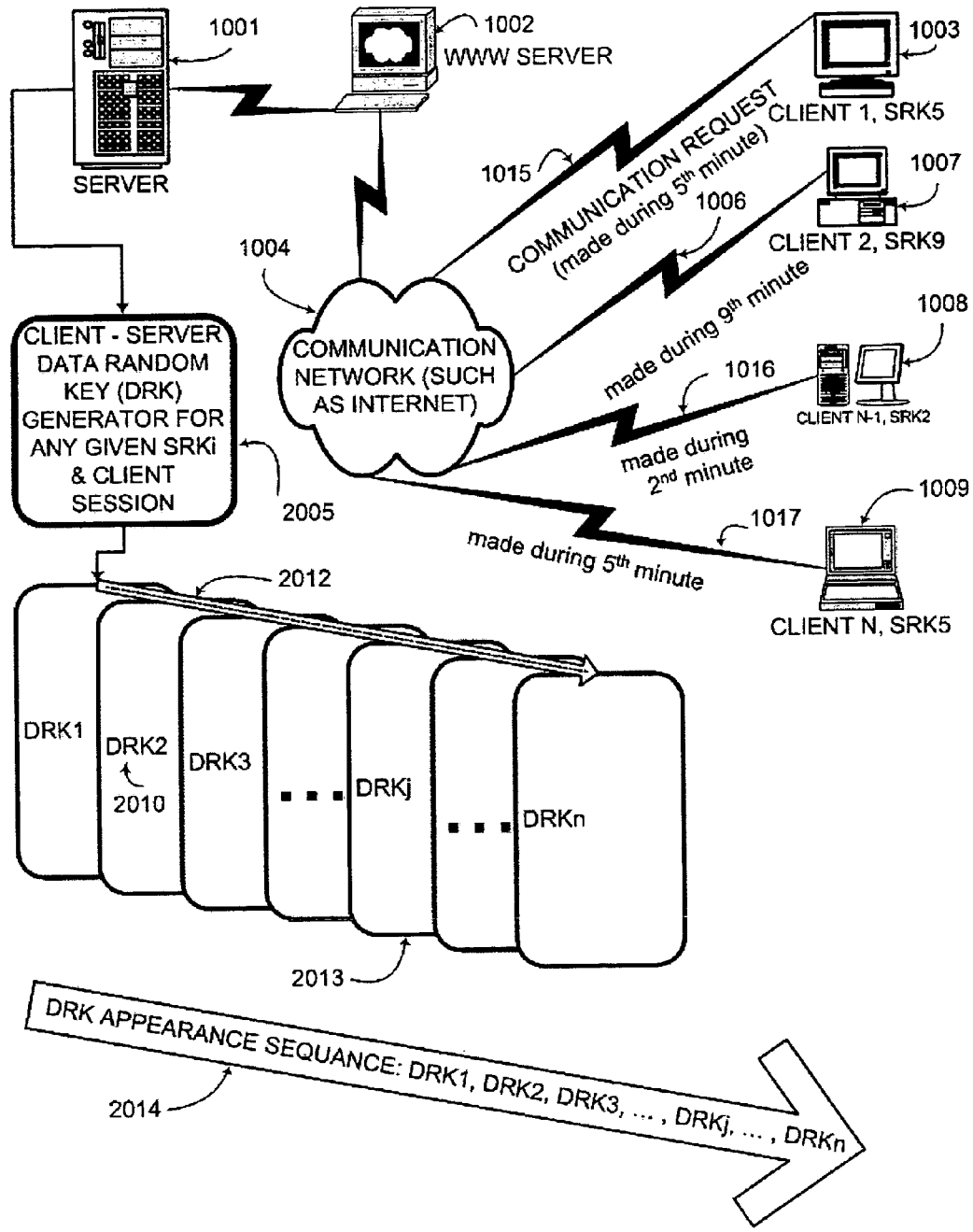
FIG. 2 is a graphic illustration of the Array of Data Encryption Keys (ADEK) branch of the TILSA algorithm according to the present invention.

FIG. 2 is a graphic illustration of the Array of Data Encryption Keys (ADEK) branch of the TILSA algorithm according to the present invention. The essential part of TILSA is generating (Data Random Key Generator 2005) an array of Data Random Keys (DRK) 2013—secret keys to support the authentication session for any particular SRK 1011 starting a communication session thread. This array of DRK (Array of Data Encryption Keys (ADEK) 2012) is regenerated and specifically attributed to each SRK 1011, together and concurrently with originating any new SRK 1011 with the logic located on the server side; explaining why there is no latency in the DRK supply during a client/server encrypted authentication session. The number of DRK 2013 in ADEK 2012 is fixed, acting as a security parameter for the MEDIA authentication protocol being presented. Each ADEK 2012 can be used for a plurality of threads initiated with a particular SRK, to which this ADEK 2012 belongs. The ADEK 2012 lifetime is limited and equal to the lifetime of the originated SRK 1011 in ASK 1013, being LT2. Deleting SRK 1011 from ASK 1013 inevitably deletes ADEK 2013, corresponding to this SRK 1011.

Once the client requested a connection to the server supported by the user name of the user on the client platform (or the client host name), a suitable SRK 1011, accompanied by LT1, not yet expired, is sent to the client by the server. In the most preferred embodiment of this invention, SRK 1011 is sent to the client in a compiled form (for example, as a class file). This is the second security tier of the authentication protocol, in view of the fact that reengineering a compiled key given a short SRK 1011 lifetime LT2 is a formidable task. Therefore, the first two security tiers make SRK 1011 quite resilient to the on line attacks during the session time, because of incommensurate times to reengineer SRK 1011 versus SRK 1011 expiration time LT2. However, SRK 1011 is still vulnerable against off line attacks and needs to be enhanced further to avoid any loss of authentication credentials and the eventual session Final Secret Key (FSK).

Figure 3:
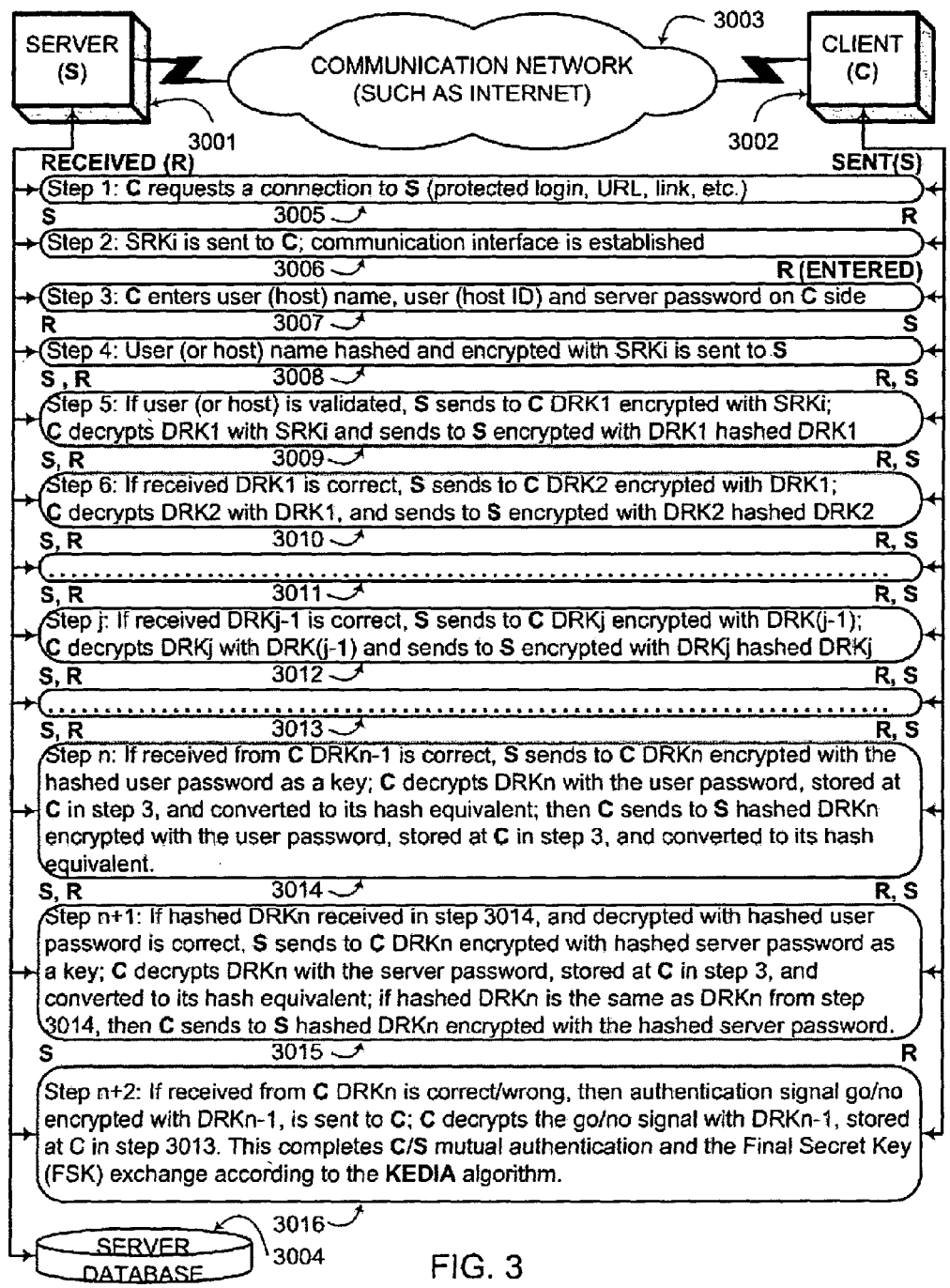
FIG. 3 is a graphic illustration of the Key Encryption/Decryption Iterative Algorithm (KEDIA) according to the present invention.

Since SRK 1011 is sent to the client as the first message, the logic located on the server and on the client sides generates a series of messages having been sent from the server to the client, and back to the server with the following Key Encryption/Decryption Iterative Algorithm (KEDIA). FIG. 3 is a graphic illustration of the Key Incryption/Decryption Iterative Algorithm (KEDIA) according to the present invention. In step 1 3005, client 3002 sends a connection request to server 3001 over communication network 3003. In step 2 3006, SRKi (with the currently active LT1$i$—between time mark i-1 minutes and time mark i minutes) is sent to client 3002, and stored there, initiating the communication interface. In step 3 3007, client 3002 enters the user name, the user password, and the server password, if it is a user at the client platform 3002, or the host name, the host ID, and the server password, if it is the client platform (the peer). In step 4 3008, the user name (or the host name) is hashed, encrypted with SRKi and sent to server 3001, while the user password (or the host ID) and the server password were not sent, remaining at client 3002.

In step 5 3009, server 3001 checks the validity of the user name (or the host name), obtained in the step 4, through the database to which it is connected. The session is terminated, if the user name (or the host name) is not valid. Otherwise, server 3001 in step 3009 sends DRK1 encrypted with SRKi to client 3002, where DRK1 is decrypted with SRKi, and stored at client 3002. During the same step 3009, client 3002 sends a DRK1, which is converted to its hash equivalent and encrypted with DRK1, to server 3001. This message confirms to server 3001 that client 3002 obtained and decrypted DRK1, and it is ready for receiving another secret key. In step 6 3010, server 3010 first decrypts hashed DRK1, received in step 5 from client 3002, with DRK1. If DRK1 is correct, server 3001 sends DRK2 encrypted with DRK1 to client 3002, where DRK2 is decrypted with DRK1, and stored at client 3002. Otherwise, the communication session is terminated. During the same step 6 3010, client 3002 sends a DRK2, converted to its hash equivalent, and encrypted with DRK2, to server 3001. This message confirms to server 3001 that client 3002 obtained and decrypted DRK2, and it is ready for receiving another secret key.

This iterative process continues up to step n 3014. Parameter n is actually the maximum number of DRK 2013 in ADEK 2012 (FIG. 2), and should be chosen for any practical implementation of this encrypted authentication protocol. Then, assuming DRKn-1 hash received from client 3002 in the previous step n-1 is correct, server 3001, sends DRKn, encrypted with client 3002 hashed password (taken from server database 3004, as server 3001 knows from step 4 3008, the identification of the client (or the user on the client platform)) to client 3002, where DRKn is decrypted with the client 3002 password, stored at the client side in step 3. During the same step n, client 3002 sends to server 3001 hashed DRKn encrypted with the client 3002 password, stored at client 3002 at step 3 and converted to its hash equivalent. Step n is an important first phase towards client/server mutual authentication. Indeed, the client can decrypt DRKn only in the case where client 3002 knows the user 3002 password. Then, client 3002 encrypts hashed DRKn with the client 3002 hashed password, as a secret key and sends it back to server 3001 in same step n 3014. Having received DRKn encrypted with client 3001 password, server 3001 decrypts it with the client 3001 password, and, if it is correct, server 3001, in step n+1 3015, sends to client 3002 DRKn encrypted with hashed server 3001 password as a key.

Certainly, client 3002, already aware of DRKn from the previous step n 3014, compares the result of decrypting the last message with the server 3001 password, stored at client 3001 in step 3 3007, and converted to its hash equivalent, with DRKn. If they are the same, the client is assured that the communication session is with the correct server, as only client 3002 and server 3001 know the server 3001 password. Otherwise, the client 3002 terminates the communication session, and intrusion detection is reported. Eventually, during same step n+1 3015, client 3002 sends to server 3001 hashed DRKn encrypted with the server password, stored at client 3002, at step 3 3007, and converted to its hash equivalent. This message, transmitted back to server 3001, means that client 3002 has established trust to server 3001. In step n+2 3016, server 3001 decrypts hashed DRKn with the server password from the 3004 database connected to the server, and compares the result with DRKn at server 3001. Depending on the comparison results, server 3001, during same step n+2 3016, sends to client 3002 the authentication signal "go/no" encrypted with DRKn-1, stored at client 3002, at the step, prior to step 3014. This completes the client/server mutual authentication and Final Secret Key (FSK) exchange according to the KEDIA algorithm.

One encryption/decryption algorithm used in an embodiment of the invention is the Triple Data Encryption Standard block cipher algorithm. Triple-DES (3DES), based upon the Triple Data Encryption Algorithm (TDEA), is described in FIPS 46-3. Other block cipher algorithms are also suitable, including RC6, Blowfish/Twofish, Rijndael, and AES. See, Bruce Schneier, Applied Cryptography, Second Edition, John Wiley and Sons, Inc., cited above.

In this form the KEDIA algorithm, described above as part of the authentication communication protocol, is the third security tier, efficient against online and offline intruding attacks. Among other factors, the security against online attacks is increased due to effectively extending the time, needed by an intruder to decrypt the entire series of DRK 2013 in ADEK 2012, whereas the ADEK 2012 life time is quite limited and is actually equal to LT2, the same as for SRK 1011, which originated this ADEK 2013. As mentioned above, the number of DRK 2013 in ADEK 2012 is the authentication protocol security parameter and can be chosen according to the security requirements, considering the actual system CPU and network resources. Security against offline attacks is assured through the mutual client/server authentication utilizing shared secrets known only to the client, and to the server. Moreover, the client supposed to perform a strong (two factors) authentication, as the KEDIA algorithm requires the client to enter correctly the client (the user on the client platform) password and the server password, unique to the client (the user on the client platform). Important security feature of the KEDIA algorithm are (1) that client/server passwords never enter communication lines in either form, (2) client/server pair performs mutual authentication in steps n 3014, n+1 3015, and n+2 3016, and (3) client/server pair exchanges FSK enabling transmitted data encryption during the post-authentication stage of the communication session.

In the case where an intruder intercepts the last message in step n+2, and somehow knows the format of the "go/no" authentication signals, a brute force computer processing attack could be applied to uncover DRKn−1. However, the intruder would only gain limited access as DRKn−1 is detached from client/server authentication credentials, and from DRKn (which is FSK in this particular embodiment of the KEDIA algorithm).

Therefore, an offline attack is senseless, as the intruder going backward through steps 3013, 3010, 3009, and 3008 could find DRKn−2 DRKn−3, ..., DRK1, and eventually SRKi, which are all only one-time session random keys, and they cannot be reused. Certainly, the intruder could further decrypt the user name; however, this is not regarded as a secret. The time DRKn−1, operating during the client/server communication session, is excruciatingly small for attempting an online computer processing attack. Even assuming this attack successful, all, the intruder could do is to send to client 3002 an incorrect authentication signal, which will be visualized in the user's session GUI, but would never take effect in the actual system. This is because the authentication signal "go/no" enables functionality through the server 3001 side logic.

The KEDIA algorithm security has been further significantly enhanced by integrating and synthesizing it with the Byte-Veil-Unveil (ByteVU) algorithm, the Bit-Veil-Unveil (BitVU) algorithm, and the Byte-Bit-Veil-Unveil (BBVU) algorithm. All three algorithms are built around the idea that every encrypted message in the client/server dialogue in the KEDIA algorithm is a fixed byte size, relatively small (typically 16 bytes) message. The algorithms employ the fact that the server already has identified who the client pretends to be, after receiving the user name (or the host name) during the initial connection request. At this time, the server finds the password, or another shared secret, corresponding to the user name (or the host name), in the server database 3004, connected to the server. Then, the server employs this information to disassemble only message bytes, or only bits, or the combination thereof, inside a certain conversion array, making their reassembling a highly improbable task, unless the client knows the shared secret. In this case, the message, which is the encrypted key, is easily recovered and eventually decrypted with the secret key, learned from the previous message.

Figure 4:
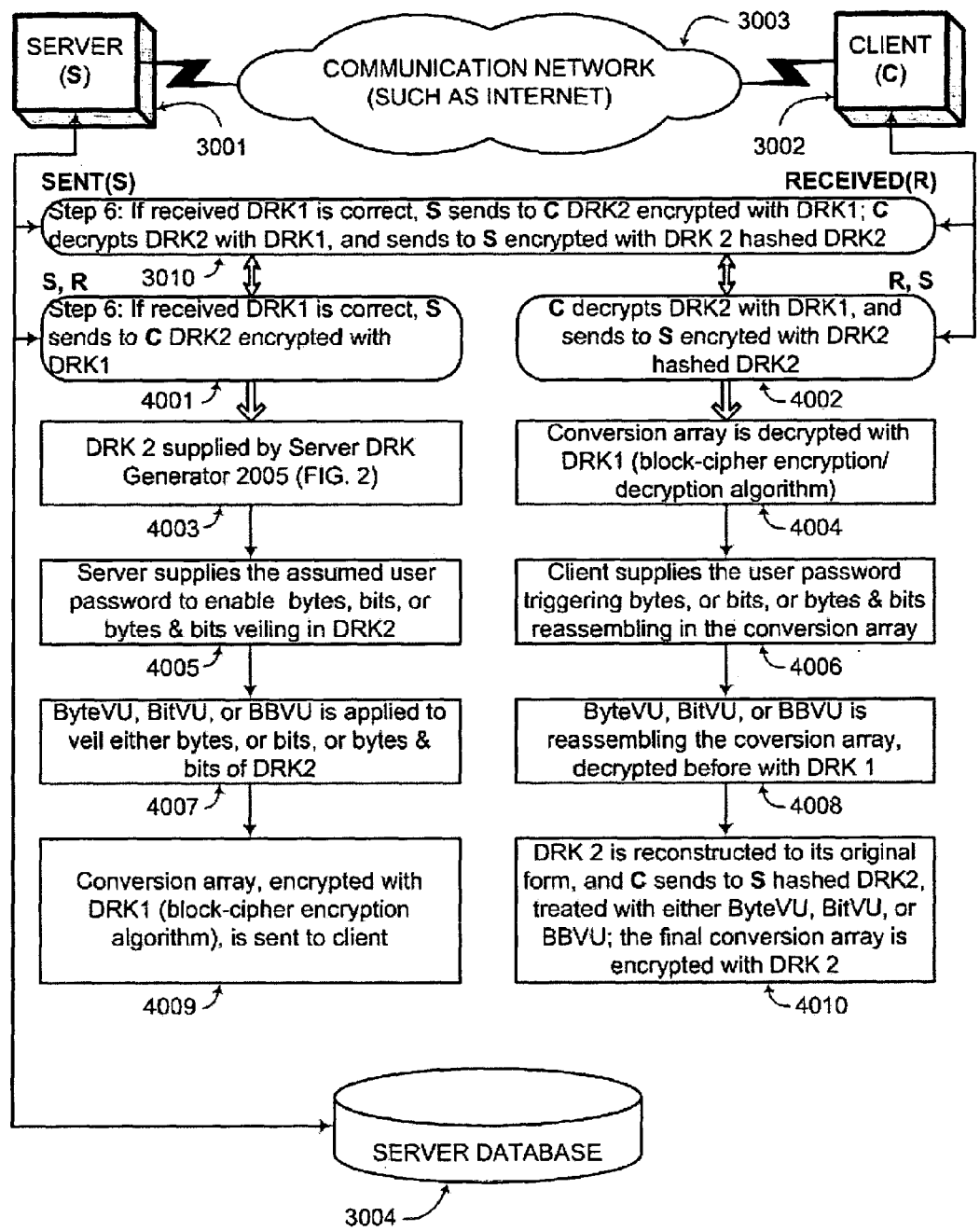
FIG. 4 is a graphic illustration of the KEDIA typical message encryption at the server and its decryption at the client applying one of Byte-Veil-Unveil (ByteVU), Bit-Veil-Unveil (BitVU), or Byte-Bit-Veil-Unveil (BBVU) algorithms according to the present invention.

FIG. 4 is a graphic illustration of the KEDIA algorithm. This is a typical message encryption at the server and its decryption at the client, applying along with encryption and decryption procedures one of Byte-Veil-Unveil (ByteVU), Bit-Veil-Unveil (BitVU), or Byte-Bit-Veil-Unveil (BBVU) algorithms, according to the present invention. Step 6 3010 has been chosen as a typical message example in the KEDIA algorithm. According to FIG. 3, during this step, server 3001 sends DRK2 encrypted with DRK1 to client 3002, where DRK2 is decrypted with DRK1, received by client 3002 in the previous step 3009 from server 3001. In FIG. 4, step 3010 is split for clarity into two parts 4001 and 4002, which are related to preparing the message at server 3001, and treating the received message at client 3002, respectively. Blocks 4003, 4005, 4007, and 4009 depict the process the message is going through, before it is sent to client 3002. DRK2 (for instance, 16 bytes long, secret key to be used with a block-cipher encryption algorithm) is supplied by Server DRK Generator 2005 (see FIG. 2) 4003. In the following step 4005, server 3001, already having identified who claims to be the user on the client platform, (or what is the claimed client platform host name), extracts the respective user password (or the client host ID) from the database 3004 attached to server 3001. Eventually, according to block 4007, server 3001 uses this information to trigger operation of one of ByteVU, BitVU, or BBVU algorithms, having been chosen by a particular security system, considering security requirements vs. cost trade-offs (time of operations, CPU power of client/server platforms, and the network throughput). As a final result 4009, the conversion array, containing disassembled DRK2 bytes, or bits, or the combination thereof, gets encrypted with DRK1, and sent to client 3002.

Part 4002 of step 3010, related to the received message treatment at client 3002, is expanded by the series of blocks 4004, 4006, 4008, and 4010 in FIG. 4. According to block 4004, client 3002 decrypts the conversion array with DRK1, stored by client 3002 from the previous message 3011 from server 3001. Then, client 3002 supplies the user password (or the client host ID) which was entered into the KEDIA algorithm at step 3 3007 (see FIG. 3), enabling reassembling of DRK2 from the decrypted conversion array 4006. As it is shown in block 4008, the operation is triggered for one of ByteVU, BitVU, or the BBVU algorithms, having been chosen on the client side the same one, as on the server side. Eventually, according to block 4008, either the message bytes, or bits, or the combination thereof, get reassembled, and finally, as it is shown in block 4010, DRK2 is reconstructed to its original form.

Figure 5:
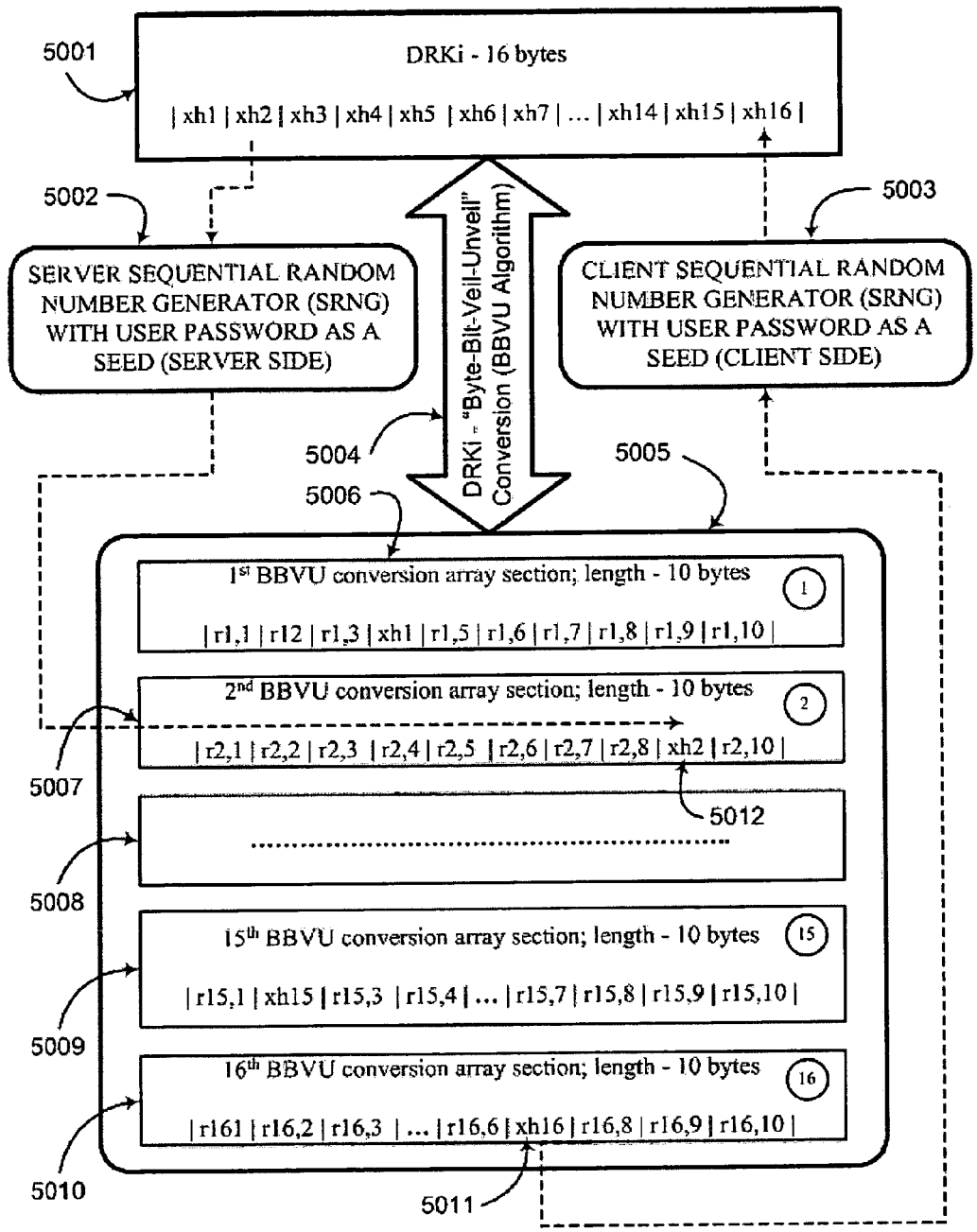
FIG. 5 is a block diagram of the Byte-Veil-Unveil (ByteVU) algorithm according to the present invention.

In compliance with FIG. 4, each message of the KEDIA algorithm employs additional treatment as compared to the standard encryption/decryption operations. This treatment is triggered by the client/server shared secret at the sending and receiving communication channel ends. FIG. 5 is a block diagram of the Byte-Veil-Unveil (ByteVU) algorithm according to the present invention. Block 5001 shows DRKj, where each byte is separated from a neighboring byte with a vertical bar. Without sacrificing any generality of the ByteVU algorithm, DRKj is assumed to be a 16-bytes key in FIG. 5. The user password (or the client host ID), supplied by server 3001 in a hashed form, plays a seed role for Server Sequential Random Number Generator (SRNG) 5002. SRNG 5002 generates a random sequence of integers, and it is the same sequence of integers, each from 1 to 10, for any given seed. In other words, the password (or the client host ID) and the SRNG sequence of integers are uniquely associated. Block 5005 introduces a conversion array which, without sacrificing any generality limitations of ByteVU algorithm, has 16 equal sections 5006, 5007, 5008, 5009, and 5010, with 10 bytes per each section. FIG. 5 presents an exemplary case, when SRNG 5002 generated 16 sequential integers 4, 9, . . . , 2, and 7.

The first integer 4 is used by the logic located by the server 3001 to replace byte r1,4 in the first section 5006 of conversion array 5005 by the first byte xh1 of DRKj in 5001. Similarly, the second integer 9 is used by that same logic to replace byte r2,9 in the second section of conversion array 5005 by the second byte xh2 5012 of DRKj in 5001. The same procedure is applied to all integers in the sequence generated by SRNG 5002, until DRKj $15^{th}$ byte xh15 in 5001 is replacing the $2^{nd}$ byte r15,2 in the $15^{th}$ section 5009 of conversion array 5005, and eventually DRKj $16^{th}$ byte xh16 in 5001 is replacing the $7^{th}$ byte r16,7 in the $16^{th}$ section of conversion array 5005. Once all bytes of DRKj are veiled in this manner inside conversion array 5005, the entire conversion array 5005 is encrypted with DRKj−1, and the message is sent to client 3002. At client 3002, the encrypted conversion array is decrypted with DRKj−1, saved at client 3002, from the previous server message (step 3011 in KEDIA, FIG. 3).

The next procedure, reversed as compared to the procedure described above on the server 3001 side, is applied. The user password (or the client host ID) saved at the client platform in step 3007 of the KEDIA algorithm (see FIG. 3) is supplied in a hashed form as a seed to Client Sequential Random Number Generator (SRNG) 5003, identical to the one on the server 3001 side. This password (or host ID) triggers SRNG 5003 to generate the same sequence of integers, as on server 3001 side before 4, 9, . . . , 2, 7. Then, the logic placed on client 3002 used the first integer 4 to extract DRKj first byte xh1 from the fourth position in first 10 bytes section 5006 of conversion array 5005, and place it back in the $1^{st}$ position of DRKj 5001. Consequently, the second integer 9 is used to extract DRKj second byte from the $9^{th}$ position in 10 bytes section 5007 of conversion array 5005, and place it back into the $2^{nd}$ byte position of DRKj 5001. This procedure is going on, until, eventually, the $15^{th}$ byte of DRKj xh15 is extracted from the $2^{nd}$ byte position in $15^{th}$ 10 bytes section 5009 of conversion array 5005, and placed back into $15^{th}$ byte position of DRKj 5001 as well as the $16^{th}$ byte of DRKj xh16 5011 extracted from the $7^{th}$ byte position in $15^{th}$ 10 bytes section 5010 of conversion array 5005, and placed back into $15^{th}$ byte position of DRKj 5001. This completes the reassembling procedure of the ByteVU algorithm to restore DRKj at client 3002.

A suitable sequential random number generator SRNG for use in embodiments of the invention is a Java version of the well known "Lehmer generator." See, Park & Miller, "Random Number Generators, Good Ones are Hard to Find," Communications of the ACM, Vol. 31, No. 10, (1988), pages 1192-1201.

Figure 6:
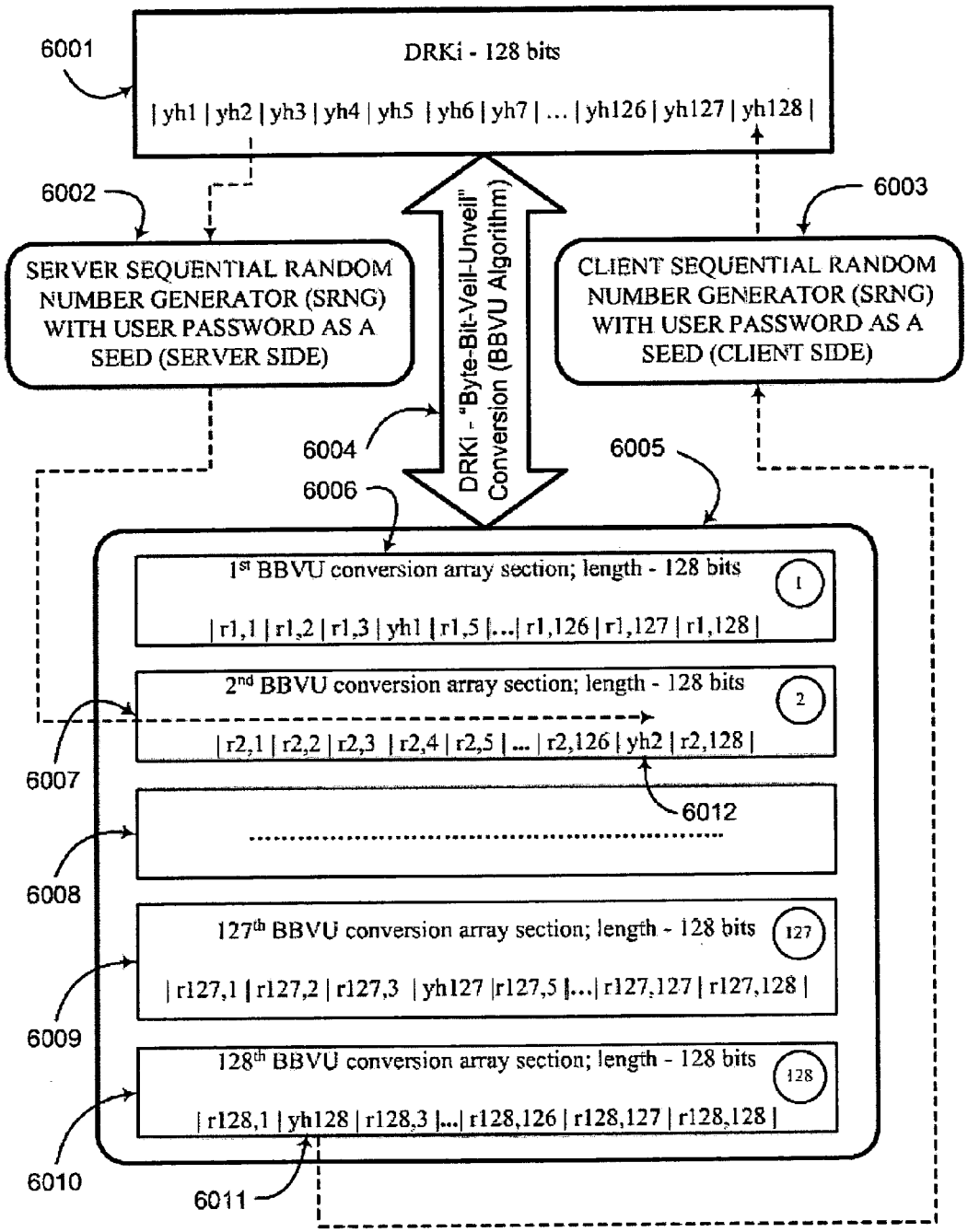
FIG. 6 is a block diagram of the Bit-Veil-Unveil (BitVU) algorithm according to the present invention.

FIG. 6 is a block diagram of the Bit-Veil-Unveil (BitVU) algorithm according to the present invention. The BitVU algorithm is a natural extension of the ByteVU algorithm. Instead of veiling bytes of DRKj, the BitVU algorithm veils bits of DRKj. It is assumed, without sacrificing any generality limitations of the BitVU algorithm, that DRKj bit size is 128 bits 6001. Each bit of DRKj in 6001 is separated from a neighboring bit with a vertical bar. Server Sequential Random Number Generator (SRNG) 6002 uses the user password (or the client host ID) supplied by the server in a hashed form as a seed, allowing for the generation of a random series of 128 integers with values ranging from 1 to 128 (for instance, 4, 127, . . . , 4, 2), and each one pointing to a DRKj consecutive bit veiled position in conversion array 6005, respective sections 6006, 6007, . . . , 6008, . . . , 6009, and 6010 of 128 bit size each. In other words, the password (or the client host ID) and the SRNG 6002 sequence of integers are uniquely associated.

Block 6005 introduces a conversion array which, without sacrificing any generality limitations of BitVU algorithm, has 128 equal sections 6006, 6007, . . . , 6008, . . . , 6009, and 6010, with 128 bits per each section. FIG. 6 presents an exemplary case, when SRNG 6002 generated 128 sequential integers 4, 127, . . . , 4, and 7. For this exemplary case disclosed in FIG. 6, the $1^{st}$ bit of DRKj 6001 yh1 is put into the $4^{th}$ bit position of first section 6006 instead of r1,4 bit; then the $2^{nd}$ bit of DRKj 6001 yh2 6012 is put into $127^{th}$ bit position of second section 6007 instead of r2,127 bit, and so on, until $127^{th}$ bit of DRKj 6001 is put into the $4^{th}$ position of $127^{th}$ section 6009 instead of r127,4 bit. Ultimately, the $128^{th}$ bit of DRKj 6001 is put into the $2^{nd}$ bit position of the $128^{th}$ section 6010 of conversion array 6005 instead of r128,2 bit. Once all bites of DRKj are veiled in this manner inside conversion array 6005, the entire conversion array 6005 is encrypted with DRKj−1, and the message is sent to client 3002.

At client 3002, the encrypted conversion array is decrypted with DRKj−1, saved at client 3002, from the previous server message (step 3011 in the KEDIA algorithm, FIG. 3). Then the procedure, a reversed one as compared to that which is described above for the BitVU algorithm on server 3001 side, is applied. The user password (or the client host ID) saved at the client platform in step 3007 of the KEDIA algorithm (see FIG. 3) is supplied in a hashed form as a seed to Client Sequential Random Number Generator (SRNG) 6003, identical to the one on the server 3001 side. This password (or host ID) triggers SRNG 6003 to generate the same sequence of integers as on server 3001 side before, that is 4, 127, . . . , 4, 2. Then, the logic placed on client 3002 used the first integer 4 to extract DRKj $1^{st}$ byte yh1 from the $4^{th}$ position in $1^{st}$ 128 bits section 6006 of conversion array 6005, and placed it back in the $1^{st}$ position of DRKj 6001. Consequently, the second integer 127 is used to extract DRKj $2^{nd}$ bit from the $127^{th}$ position in $2^{nd}$ 128 bits section 6007 of conversion array 6005, and place it back into the $2^{nd}$ bit position of DRKj 6001. This procedure continues until, ultimately, the $127^{th}$ bit of DRKj yh127 is extracted from the $4^{th}$ bit position in $127^{th}$ 128 bits section 6009 of conversion array 6005, and placed back into $127^{th}$ bit position of DRKj 6001, as well as the $128^{th}$ bit of DRKj yh128 6011 being extracted from the $2^{nd}$ bit position in $128^{th}$ 128 byte size section 6010 of conversion array 6005, and placed back into $128^{th}$ bit position of DRKj 6001. This completes the reassembling procedure of the BitVU algorithm to restore DRKj at client 3002.

Figure 7:
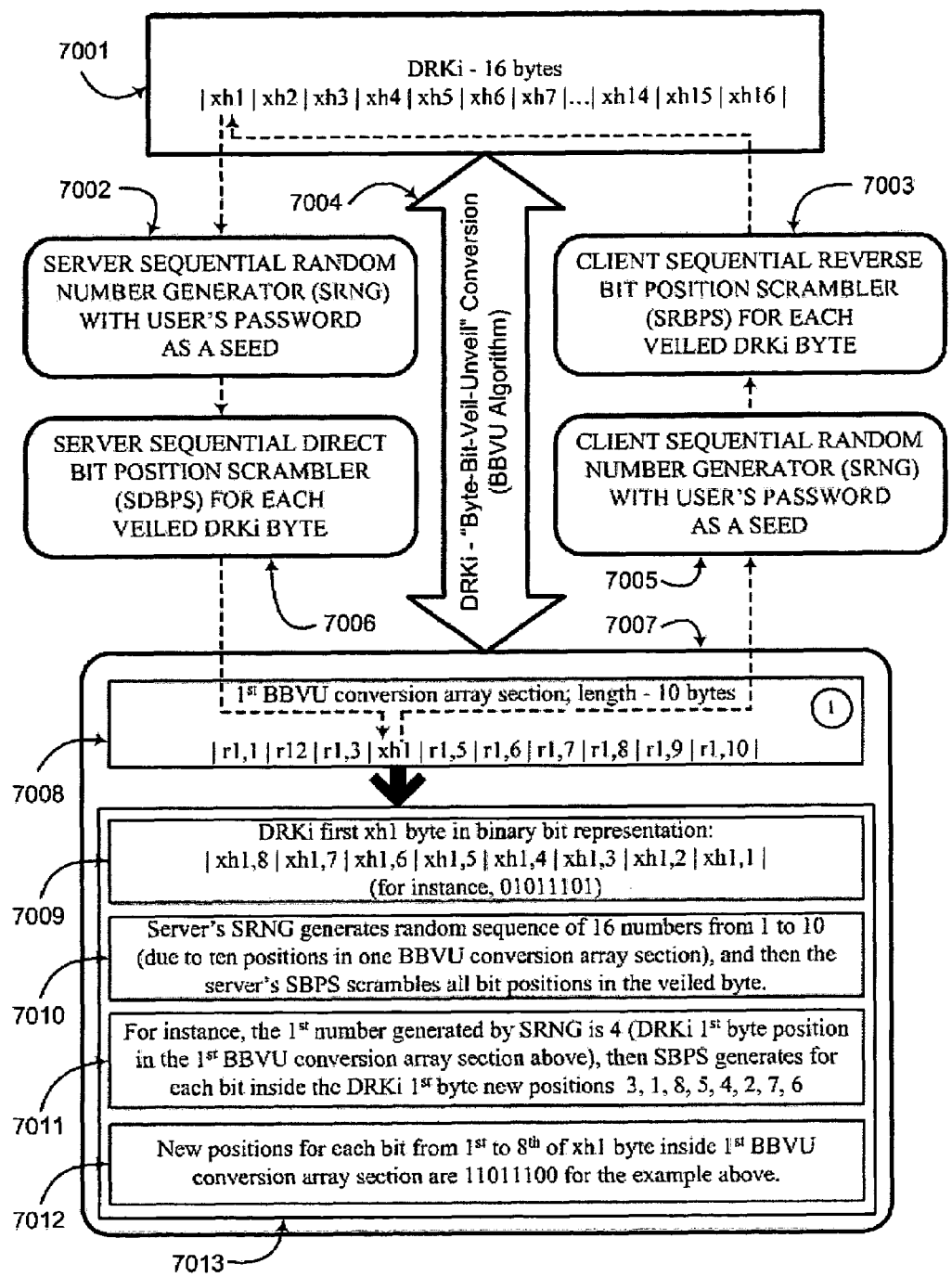
FIG. 7 is a block diagram of the Byte-Bit-Veil-Unveil (BBVU) algorithm according to the present invention.

FIG. 7 is a block diagram of the Byte-Bit-Veil-Unveil (BBVU) algorithm according to the present invention. Block 7001 shows DRKj, where each byte is separated from a neighboring byte with a vertical bar. Without sacrificing any generality limitations of the BBVU algorithm, DRKj is assumed to be a 16-bytes key in FIG. 7. The user password (or the client host ID), supplied by server 3001 in a hashed form, plays a seed role for Server Sequential Random Number Generator (SRNG) 7002. SRNG 7002 generates a random sequence of 16 integers, and then the server's Sequential Direct Bit Position Scrambler (SDBPS) 7006 scrambles all bit positions in the veiled byte 7010. SDBPS 7006 generates a random series of non-repeating eight digits within the range from 1 to 8, for each of SRNG 7002 integers in the sequence. In other words, the password (or the client host ID), the SRNG 7002 sequence of integers, and the series of digits generated by SDBPS 7006 are uniquely associated. Applying the same seed (the user password, or the server host ID, in a hashed form) will result in the same sequence of integers generated by SRNG 7002, and the same series of digits generated by SDBPS 7007 for each integer in the sequence.

Block 7006 introduces a conversion array which, without sacrificing any generality limitations of the BBVU algorithm, has 16 sections similar to 7008, with 10 bytes per section. Similarly to the ByteVU algorithm, each section will veil one byte of DRKj 7001 in a position, respective to the particular integer value generated by SRNG 7002. For instance, the $1^{st}$ byte of DRKj 7001 xh1 occupies the $4^{th}$ byte position in section 7008, replacing r1,4 byte. FIG. 7 presents an exemplary case, where the $1^{st}$ DRKj byte xh1 has an 8-bit representation from the most significant bit xh1,8 to the least significant bit xh1,1 7009, and chosen as 01011101 in FIG. 7 7009. SRNG 7002 generated 16 sequential integers 4, ..., while SDBPS 7006 generated a series of eight non-repeating digits 3, 1, 8, 5, 4, 2, 7, and 6 for the first integer 4 7011, and a similar series of digits for the rest of the integers. Eventually, all bits of the $1^{st}$ DRKj 7001 byte in 7008 occupy new bit positions, consecutively specified in the SDBPS 7006 generated series of digits for the first integer 4. For a particular example in FIG. 7 7012, it is 01011011. The same process 7013 of scrambling bits for each veiled byte of DRKj 7001 in conversion array 7007 is continued, until all bytes of DRKj are veiled, and all bit positions of each veiled byte are scrambled. Then, the entire conversion array 7007 is encrypted with DRKj−1, and the message is sent to client 3002.

At client 3002, the encrypted conversion array is decrypted with DRKj−1, saved at client 3002, from the previous server message (step 3011 in KEDIA, FIG. 3). Then the procedure, a reversed one as compared to that which is described above for the BBVU algorithm on server 3001 side, is applied. The user password (or the client host ID), saved at the client platform in step 3007 of the KEDIA algorithm (see FIG. 3), is supplied in a hashed form as a seed to Client Sequential Random Number Generator (SRNG) 7005 identical to the one on the server 3001 side. This password (or host ID) triggers SRNG 7005 to generate the same sequence of integers as on server 3001 side before 4 Client Sequential Reverse Bit Position Scrambler (SRBPS) 7003 generates the reversed series of digits for each integer, as compared to its server counterpart SDBPS 7006. For instance, for the first integer 4, SRBPS 7003 generates the reversed series 2, 6, 1, 5, 4, 8, 7, and 3, which allows the logic placed on client side 3002 to restore bits in the original order for the $1^{st}$ byte of DRKj means that the $2^{nd}$ bit of the scrambled byte will become the least significant bit in the restored $1^{st}$ DRKj byte, and so on, until 3, the last digit in the series, is reached, indicating that the $3^{rd}$ bit in the scrambled byte will become the most significant bit in the restored $1^{st}$ byte. Meanwhile, integer 4 points to the $4^{th}$ position in section 7008 of conversion array 7007, where the $1^{st}$ DRKj byte has been veiled. The same procedure continues, until all byes of DRKj 7001 and their respective bits are returned to their original positions. This completes the reassembling procedure of the BBVU algorithm to restore DRKj at client 3002.

At this time it is important to note that the ByteVU, BitVU, and BBVU algorithms, disclosed above, require assessment of security of these algorithms against possible computer processing attacks now and in the future. Table 1 below presents a summary of this assessment. SRNG 5002, 5003 (FIG. 5), 6002, 6003 (FIG. 6), and 7002, 7003 (FIG. 7) generate integers pseudo-randomly, as well as SDBPS 7006 and SRBPS 7003 (FIG. 7). Hence, probabilities of veiling each byte and bit inside a Conversion Array (CA) for each algorithm can be viewed as independent ones. Best microprocessors achieved ~1 GHz clock rate barrier by the beginning of the $21^{st}$ century. Previously, forecasting allowed for at least 25-35 years, until the clock rate would reach ~(100-1000) GHz. Thus, currently available ~1E10 instructions per second could reach ~(1E12-1E13) instructions per second in a distant future, (assuming microprocessor RISC pipelined architecture with up to 10 stages per cycle). A very conservative assumption is made that the attacking computers have 100% efficiency of their CPU utilization during an attack. In other words, testing each possible combination of all bytes, bits, or the combination thereof, of a veiled message in CA will consume only one microprocessor instruction.

Column 1001 in Table 1 presents particular geometries of CA chosen in each algorithm for the assessment. Column 1002 gives the bit size of each algorithm CA for every geometry selected in 1001. Column 1003 presents the total number of pseudo-random integers generated by SRNG of each algorithm with respect to the geometries chosen in 1001. Column 1004 introduces probability models for each algorithm with respect to the geometries of CA chosen in 1001. Every position in 1004 gives probability to estimate the entire combination of veiled bytes, bits, or the combination thereof, for each algorithm, under given geometry of CA in 1001. Column 1005 presents for each CA its transit time, given the slowest standard modem of 28.8 kbps (kilobits per second) of contemporary networks (for example, the Internet). Column 1006 presents assessed time, required for a brute force attack now and in a distant future, for each algorithm and their respective geometries of CA chosen in 1001. Column 1007 presents an approximate time for one advanced microprocessor 1 GHz/100 GHz) instruction now, and in a distant future.

TABLE 1

| | 1001 ↓ CA Size # of rows vs. # of BB | 1002 ↓ CA Total Bit Size | 1003 ↓ SRNG total # | 1004 ↓ Probability Model for CA | 1005 ↓ CA Transit Time modem 28.8 kbps | 1006 ↓ Brute Force Attack Time Now/Future | 1007 ↓ CPU One Instruction Time, (S) Now/Future |
| --- | --- | --- | --- | --- | --- | --- | --- |
| ByteVU | 16r/16 bytes | 2048 bits | 16 | $(1/16)^{16}$ | 71 milliSec. | 58 y/7 months | 1E-10/1E-12 |
| BitVU | 128r/2 bits | 256 bits | 128 | $(1/2)^{128}$ | 9 milliSec. | 1E21 y/1E19 y | 1E-10/1E-12 |
| BBVU | 16r/2 bytes | 256 bits | 144 | $((.5)(1/8)^8)^{16}$ | 9 milliSec. | 8E102y/8E100y | 1E-10/1E-12 |

Summarizing the assessment results in Table 1, it can be noted that each of ByteVU, BitVU, and BBVU algorithms give extremely high security now and in a distant future for the respective geometries selected in 1001. At the same time, one CA message transit times 1005, even for the slowest standard modems, are reasonable enough for the disclosed algorithms' practical utilization in the MEDIA protocol. Certainly, geometry parameters in 1001 can be regarded as security parameters of the MEDIA protocol, and these parameter changes could allow for security trade-offs vs. cost (CPU power of client/server or authenticator/peer platforms, and the network throughput). Also, replacing slow modems by contemporary high-speed network connections, like DSL, would significantly reduce message transit times in 1005.

The combination of the KEDIA algorithm and any one of ByteVU, BitVU, and BBVU algorithms comprise the fourth security tier, which makes the encrypted authentication protocol highly secure against online and offline attacks. The algorithms described above allow for the encryption key management security to be scaled with CPU and network throughput resources. During the encryption key distribution stage over communication lines, shared secrets never leave the server, or the client. However, they are repeatedly employed for each iterative message encryption/decryption by KEDIA and any of ByteVU, BitVU, or BBVU algorithms on the server and the client platform as well. Only when the client and the server eventually have in their possession the Final Secret Key (FSK) satisfying the required security level, then the server and the client will perform mutual authentication in a way that neither of authentication credentials enter communication lines in either form. The authentication session is denied, provided the parties' mutual authentication is not successfully completed. This part of the encrypted authentication protocol completes the client/server mutual authentication. At the same time, it is the final fifth security tier of the encrypted authentication protocol.

FIG. 8A and FIG. 8B illustrate the server and the client side of the Message Encrypt/Decrypt Iterative Authentication (MEDIA) protocol according to the present invention. Without sacrificing any generality limitations of the MEDIA protocol, the exemplary case presented in FIG. 8A and FIG. 8B is assuming HTTP communication protocol (RFC 2068 Hypertext Transfer Protocol—HTTP/1.1 January 1997), Java applet/servlet multi-threading object-oriented communication technology, and a standard Web server technology. However, the MEDIA protocol can be integrated into any other network communication protocol, and enabled with various object-oriented technologies. The ByteVU algorithm has been included into the MEDIA protocol in FIG. 8A and FIG. 8B, though any of BitVU and BBVU algorithms could serve there equally well.

Messages sent to the client and received at the server are numbered in 8000. Key functional message destinations on the server side are in 8001, and on the client side they are in 8016. For each message received at the server, its content description is in 8003, whereas for each message received at the client, its content description is in 8014. Similarly, for each message sent from the server, its content description is in 8002, whereas for each message sent from the client, its content description is in 8015. The choice of any one of ByteVU, BitVU, or BBVU algorithms to be used in the MEDIA protocol and the parameters of the respective conversion array are in 8006 for the server side, and in 8010 for the client side. Seeds, having been used to trigger SRNG (Sequential Random Number Generator), are in 8007 for the server side, and they are in 8009 for the client side. Which direction a particular MEDIA message is sent towards, is in 8008. The ByteVU algorithm conversion array parameters, chosen in FIG. 8A and FIG. 8B (10 sections with 25 bytes size of each), give extremely high security protection against online and offline intruding attacks, even for one MEDIA message as it was shown above. Therefore, it is practically justifiable to reduce iterations in the KEDIA algorithm by limiting DRKn in FIG. 3 to DRK2 only. It saves client/server platforms CPU and network resources, while keeping a very high security level.

It is assumed, without sacrificing any generality of the MEDIA protocol, that for this particular embodiment of the MEDIA protocol (FIG. 8A and FIG. 8B), the client is a user at the client platform. The communication session begins with the user's request (message 1) to the server to reach a protected network resource, for example, a URL (Universal Resource Locator), a protected link, a protected file, a protected directory, or another protected network resource. This message initiates the MEDIA protocol on the server side. The server replies to the user (message 2), sending SRK 1011 (see FIG. 1) over the communication line (the Internet) in a compiled class form, which prevents any easy key reuse or reengineering, if it is intercepted by an intruder. The user enters into the GUI (Graphical User Interface, designed into the applet and sent from the server to the client in message 2 along with the SRK) the user name, the user password, and the server password. The passwords stay stored at the client, while the user name gets encrypted with the SRK and sent to the server in message 3.

The server (logic on the server side in this exemplary case could be implemented in the Java servlet technology) replies in message 4 with DRK1 2012 (FIG. 2) bytes veiled with the ByteVU algorithm, triggered by the server, supplying the hashed password of the assumed user as a seed. The resulting ByteVU conversion array is encrypted with the SRK and sent to the client. The client, having known the SRK and the user password, entered into the GUI in the previous message 3, decrypts the conversion array and reassembles DRK1 bytes. In message 5, from the client to the server, hashed DRK1 bytes are veiled with ByteVU algorithm, triggered by the user password, stored at the client earlier in step 3 (FIG. 8B), and converted to its hash equivalent. Then, the conversion array is encrypted with DRK1 and sent to the server, which decrypts the conversion array with DRK1, and triggers ByteVU with the hashed password of the assumed user, taken from the database attached to the server. If the hashed DRK1 is correct, reassembled in this way, it is actually the authentication signal from the client to the server, as nobody except the client knows the user password used to trigger the ByteVU algorithm when receiving message 4, and sending message 5.

If DRK1 is incorrect, the MEDIA protocol is terminated by the server sending a "no" authentication message (or an error message: "user password is incorrect") to the client, encrypted with SRK. Otherwise, the server sends to the client message 6 containing DRK2, which bytes are disassembled by the ByteVU algorithm, triggered by the user hashed password, used as a seed for SRNG 5002 (FIG. 5). Then, the conversion array is encrypted with DRK1 and sent to the client, where it is decrypted with DRK1 stored at the client from the previous message 5, and DRK2 bytes get reassembled by the ByteVU algorithm, triggered by the user password, stored at the client earlier in step 3 (FIG. 8B). The client replies to the server with message 7, sending to the server hashed DRK2, which bytes are veiled by the ByteVU algorithm, triggered by the user password, stored at the client in the previous message 3, and converted to its hash equivalent. The server decrypts message 7 from the client with DRK2, and reassembles the hashed DRK2 bytes with the ByteVU algorithm, triggered by the user password, taken from the attached to the server database, and converted to its hash equivalent. If DRK2 is correct, the server sends to the client message 8 with DRK2, which bytes are disassembled with the ByteVU algorithm, triggered by the server password.

Otherwise, if DRK2 is not correct, the MEDIA protocol is terminated. The conversion array of the ByteVU algorithm in message 8 is encrypted with DRK2 and sent to the client.

The client, receiving message 8 from the server, decrypts it with DRK2, and reassembles the hashed DRK2 bytes with the ByteVU algorithm, triggered by the server password, stored on the client side in message 3. Then, the client compares the decrypted and reassembled DRK2 with DRK2 from the previous message 6. If they are the same, it is viewed by the client as the authentication signal from the server, because only the client and server share the server password. Hence, it was the only server, which could send the last message 8 to the client. Now, as the trust is established by the client to the server, the client sends to the server message 9 with hashed DRK2, which bytes are disassembled with the ByteVU algorithm, triggered by the server password, stored on the client side in message 3, and converted to its hash equivalent. Eventually, the conversion array of the ByteVU algorithm is encrypted with DRK2 and sent to the server. The server, having received message 9 from the client, decrypts it with DRK2, and reassembles the hashed DRK2 bytes with the ByteVU algorithm, triggered by the hashed server password. If DRK2 is correct, it is viewed by the server as a second authentication factor from the client (the client confirmed the server password), in addition to the first factor, having been checked in the message 6 from the client (the client confirmed the user password).

This completes the mutual authentication of the client/server pair according to the MEDIA protocol, and the server is now ready to make an authentication decision. In the end, the server sends to the client message 10, which has either a "go" authentication signal, assuming DRK2 in message 9 from the client was correct, or an error message: "the server password is incorrect", assuming DRK2 in message 9 from the client was incorrect. Each signal byte is disassembled with the ByteVU algorithm, triggered by the user password from the database, attached to the server, and then the conversion array of the ByteVU algorithm is encrypted with DRK1 and sent to the client in message 10. Having received the message 10, the client decrypts it with DRK1, stored at the client platform during message 4, and reassembles the signal bytes with the ByteVU algorithm, triggered by the user password, stored at the client side in message 3.

This effectively completes the entire MEDIA protocol of the client/server communication session as presented in FIG. 8A and FIG. 8B. As one can see, authentication credentials (the user password and the server password in this particular embodiment) have never passed through communication lines in any form. Also, the client/server mutual authentication has been completed within the MEDIA protocol, as well as the exchange of FSK (Final Secret Key, which is DRK2 in this particular embodiment) having been performed within the client/server pair. The server password and the user password enable secure mutual authentication, according to the MEDIA protocol architecture. At the same time, they are both playing a role of a strong two-factor authentication of the client at the server platform.

Figure 9:
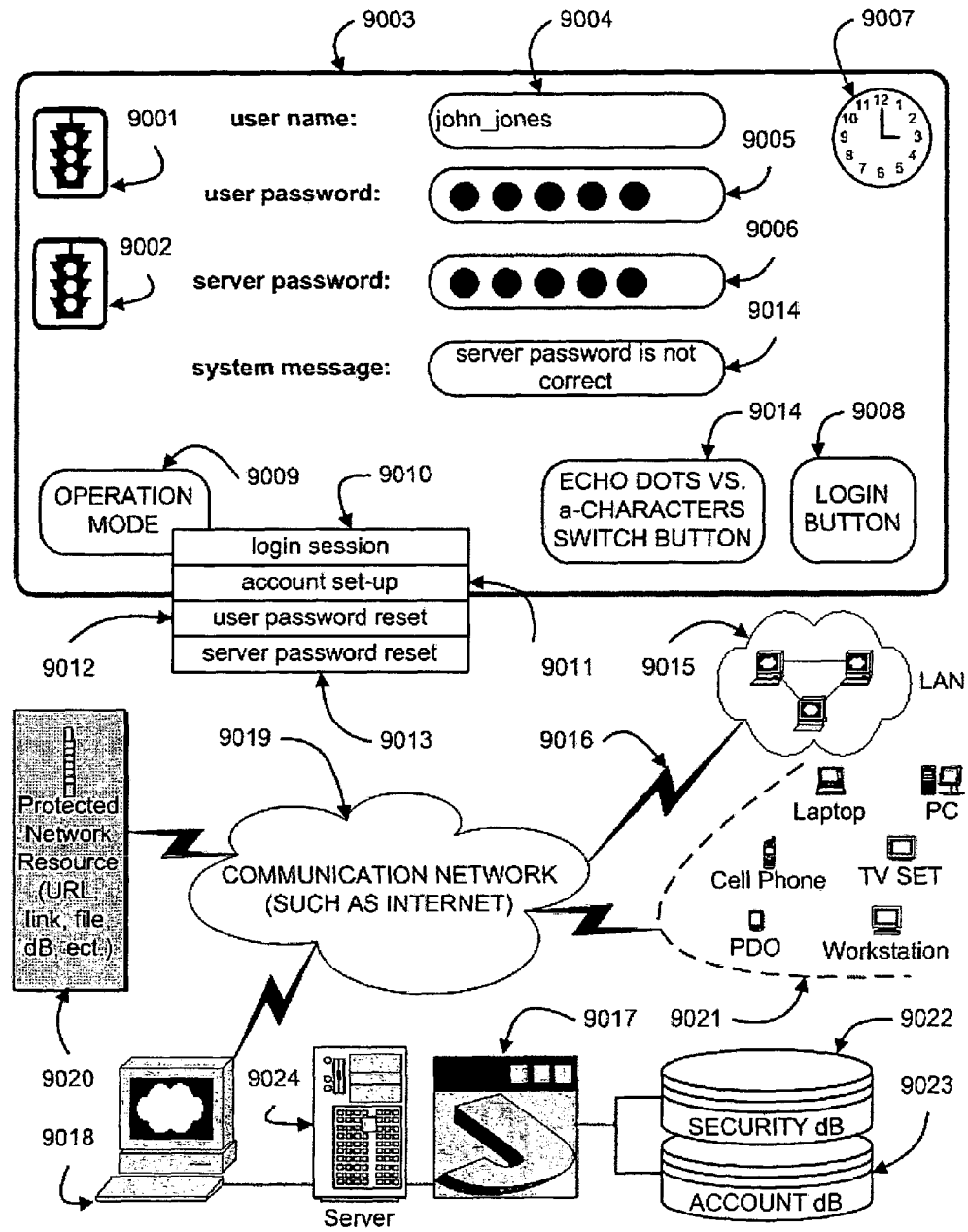
FIG. 9 illustrates the Graphical User Interface (GUI) enabling client/server mutual authentication at the client platform according to the MEDIA protocol, and a graphical illustration of the distributed protected network resources, including the authentication server, and the user base for which the MEDIA protocol is used, according to the present invention.

FIG. 9 illustrates the Graphical User Interface (GUI) enabling client/server mutual authentication at the client platform according to the MEDIA protocol, and a graphical illustration of the distributed protected network resources, including the authentication server, and the user base the MEDIA protocol is used for, according to the present invention. This GUI has already been mentioned or assumed along with the preferred embodiments of this invention, described herein, for instance, in FIG. 3 step 3 3007, FIG. 8B messages 3, 5A, and 10 8016. The user on a client platform 9015, or 9021 in FIG. 9 is trying to reach a protected network destination 9020. It invokes the MEDIA protocol through an interactive communication session between web server 9018, compute server 9024, program logic 9017, and security and account databases 9022 and 9023, all located on the server side, with GUI 9003 located on the client side. There are different means to implement this scheme, for example, thick or thin software client, permanently placed on a client platform, or a Java applet, loading GUI 9003, and its respective client-side logic into a browser. The latter case in the preferred embodiment in FIG. 9 is assumed here. Also, the network, over which the communication session is established, could be either only LAN (Local Area Network), or WAN (Wide Area Network), or a combination of LAN and WAN together. In the particular embodiment in FIG. 9, Internet 9019 is assumed as a preferred embodiment, enabling client/server dialogue through communication links 9016.

GUI 9003 has several operation modes 9009: login session mode 9010, account set-up mode 9011, user password reset mode 9012, and server password reset mode 9013. Login session 9010 is the default operation mode. The user enters the user name in window 9004, the user password in window 9005, and the server password in window 9006. The user has a choice to enter alphanumeric characters, or their echo dots for security reasons by toggling button 9014. The session elapsed time clock 9007 visualizes this value to the user, and signals communication session termination once the session time has expired. After the authentication credentials are all entered into 9004, 9005, and 9006, the client indicates login button 9008, which completes step 3 3007 in FIG. 3, or message 3 in FIG. 8B. Then the other steps of the MEDIA protocol are initiated. Stoplight 9001 turns yellow, when button 9008 is indicated, signaling the MEDIA protocol is in progress for the first authentication factor (the user password) examination. Message 8 in FIG. 8B, having arrived at the client, initiates stoplight 9001 to change color from red at the beginning of the session to green, once it is checked by the client placed logic that DRK2 delivered in the message 8 is identical to DRK2, delivered in message 6.

Similarly, stoplight 9002 turns from red to the yellow color right after stoplight 9001 turned green, signaling that the MEDIA protocol is in progress for the second authentication factor (the server password) examination. Indeed, once the client received message 10 in FIG. 8B, stoplight 9002 turns green, signaling successful client/server mutual authentication, FSK exchange, and completion of the MEDIA protocol. If the client received message 5A from the server (FIG. 8A and FIG. 8B), stoplight 9001 turns red, back from the yellow color, and the error message "the user password is incorrect" appears in system window 9014, signaling the MEDIA protocol termination. Also, if the client received authentication signal "no" in message 10 from the server (FIG. 8A and FIG. 8B), stoplight 9002 turns red, back from the yellow color, and the error message "the server password is incorrect" appears in system window 9014, signaling the MEDIA protocol termination.

Though, a server password unique to each user remains the preferred embodiment of this invention, various business environments, or enterprise/organization/agency IT resource configurations may require some modifications to the MEDIA protocol. The exemplary case would be when users of all computer platforms logged-in from the same server in an isolated LAN environment (or the same cluster of servers). Then the system administrator may preset the same server password at all platforms, during each platform configuration and setup on the network. This would require any user to enter only the user name, and the user password in GUI 9003 inside an enterprise, organization, or agency. Alternatively, messages 8 and 9 in the MEDIA protocol (FIG. 9) could be eliminated entirely for the above case, which effectively excludes the need for server password to perform a user (a client platform) authentication and a session key exchange. However, any connection with servers and users outside the particular LAN perimeter would probably require the reinstatement of server passwords for security reasons.

While the present invention is disclosed by reference to the preferred embodiments and examples detailed above, it is to be understood that these examples are intended in an illustrative rather than in a limiting sense. It is contemplated that modifications and combinations will readily occur to those skilled in the art, which modifications and combinations will be within the spirit of the invention and the scope of the following claims.

What is claimed is:

1. A method for mutual authentication in communications between first and second stations, comprising:

generating and storing a set of ephemeral session keys at the first station, ephemeral session keys in the set being associated with respective session key initiation intervals, and being discarded upon expiry of respective session key lifetimes at a time later than expiration of the respective session key initiation intervals;

in response to a request to initiate a communication session received by the first station during a particular session key initiation interval, selecting the associated session key;

sending a message carrying said associated session key to the second station, and receiving a response from the second station including a digital identifier, the digital identifier being information shared between the first station and the second station, or between the first station and a user at the second station, the digital identifier being encrypted using said associated session key to verify receipt of the session key by the second station and to identify the second station or the user of the second station;

generating and storing, in the first station, a set of intermediate data keys, the set of intermediate data keys including intermediate data key (i), for i=1 to at least n, where n is at least 2, and being discarded at a time later than expiration of the particular session key initiation interval;

executing a first set of exchanges including one or more exchanges with the second station, after verifying in said first station receipt of the session key by the second station by decrypting the digital identifier using the associated session key at the first station and positively matching the decrypted digital identifier against an existing entry in a stored list of authorized users, the first set of exchanges including in the $i^{th}$ exchange sending a message to the second station carrying intermediate data key (i) from said set of intermediate data keys encrypted using the associated session key for a first exchange in first set of exchanges and using the intermediate data key (i-1) for subsequent exchanges in the first set of exchanges, receiving a response from the second station including a hashed version of intermediate data key (i) encrypted using intermediate data key (i), decrypting the hashed version of the intermediate data key (i), calculating a hashed version of intermediate data key (i) at the first station, and matching the calculated hashed version and the received hashed version of intermediate data key (i) to verify receipt by the second station of intermediate data key (i);

executing a second set of exchanges for mutual authentication after verifying in said first station receipt of the intermediate data key (n-1) by the second station, including sending a first message carrying intermediate data key (n) encrypted using a hashed version of a first shared secret, receiving a response from the second station carrying a hashed version of intermediate data key (n) encrypted using a hashed version of the first shared secret, and decrypting the hashed version of the intermediate data key (n), calculating a hashed version of intermediate data key (n) at the first station, and matching the calculated hashed version and the decrypted hashed version of intermediate data key (n) to verify possession by the second station of the first shared secret;

sending a second message carrying intermediate data key (n) encrypted using a hashed version of a second shared secret; and if the second station sends a response to the second message, carrying a hashed version of intermediate data key (n) encrypted using a hashed version of the second shared secret, after possession by the first station of the second shared secret is verified at the second station, the verifying being accomplished at the second station by decrypting the intermediate data key (n) from the second message using the hashed version of the second shared secret, calculating a hashed version of the intermediate data key (n), and matching the calculated hashed version and the decrypted hashed version of intermediate data key (n) to verify possession by the first station of the second shared secret, then receiving the response from the second station, and decrypting the hashed version of the intermediate data key (n) using the hashed version of the second shared secret, calculating a hashed version of intermediate data key (n) at the first station, and matching the calculated hashed version and the decrypted hashed version of intermediate data key (n) at the first station to verify mutual authentication of the first and second stations; and if mutual authentication is verified at the first station, then sending a message indicating successful authentication; wherein the session key lifetimes have respective lengths which are longer than said session key initiation intervals, and less than a multiple M times a time required for verification of mutual authentication using said first and second sets of exchanges in expected circumstances, where M is less than or equal to 10.

2. The method of claim 1, including using said associated session key in response to another request to initiate a communication session from a third station received by the first station during said particular session key initiation interval, and using other session keys from the set of ephemeral session keys after expiry of said particular session key initiation interval.

3. The method of claim 2, including associating a unique set of intermediate data keys with each session key.

4. The method of claim 1, including:

providing a buffer at the first station;

storing the set of ephemeral session keys in the buffer; and removing session keys from said buffer upon expiry of respective session key lifetime.

5. The method of claim 4, wherein the session key lifetimes have respective lengths longer or equal to a time required for verification of mutual authentication using said first and second sets of exchanges in expected circumstances.

6. The method of claim 1, wherein said message indicating successful authentication carries a signal encrypted using intermediate data key (n−1) or using another prearranged one of said intermediate data keys (i).

7. The method of claim 1, including using intermediate data key (n) as a symmetrical key to encrypt data during post-authentication in communications between the first and second stations in the communication session.

8. A data processing apparatus, comprising:
   a processor associated with a first station, a communication interface adapted for connection to a communication medium, and memory storing instructions for execution by the data processor, the instructions including logic to receive a request via the communication interface for initiation of a communication session between a first station and a second station;
   logic to provide for mutual authentication in communications between the first station and a second station, comprising:
   generating and storing a set of ephemeral session keys at the first station, ephemeral session keys in the set being associated with respective session key initiation intervals, and being discarded upon expiry of respective session key lifetimes at a time later than expiration of the respective session key initiation intervals;
   in response to a request to initiate a communication session received by the first station during a particular session key initiation interval, selecting the associated session key;
   sending a message carrying said associated session key to the second station, and receiving a response from the second station including a digital identifier, the digital identifier being information shared between the first station and the second station, or between the first station and a user at the second station, the digital identifier being encrypted using said associated session key to verify receipt of the session key by the second station and to identify the second station or the user of the second station;
   generating and storing, in the first station, a set of intermediate data keys, the set of intermediate data keys including intermediate data key (i), for i=1 to at least n, where n is at least 2, and being discarded at a time later than expiration of the particular session key initiation interval;
   executing a first set of exchanges including one or more exchanges with the second station, after verifying in said first station receipt of the session key by the second station by decrypting the digital identifier using the associated session key at the first station and positively matching the decrypted digital identifier against an existing entry in a stored list of authorized users, the first set of exchanges including in the $i^{th}$ exchange
   sending a message to the second station carrying intermediate data key (i) from said set of intermediate data keys encrypted using the associated session key for a first exchange in first set of exchanges and using the intermediate data key (i−1) for subsequent exchanges in the first set of exchanges,
   receiving a response from the second station including a hashed version of intermediate data key (i) encrypted using intermediate data key (i), and decrypting the hashed version of the intermediate data key (i), calculating a hashed version of intermediate data key (i) at the first station, and matching the calculated hashed version and the received hashed version of intermediate data key (i) to verify receipt by the second station of intermediate data key (i);
   executing a second set of exchanges for mutual authentication after verifying in said first station receipt of the intermediate data key (n−1) by the second station, including
   sending a first message carrying intermediate data key (n) encrypted using a hashed version of a first shared secret,
   receiving a response from the second station carrying a hashed version of intermediate data key (n) encrypted using a hashed version of the first shared secret, and decrypting the hashed version of the intermediate data key (n), calculating a hashed version of intermediate data key (n) at the first station, and matching the calculated hashed version and the decrypted hashed version of intermediate data key (n) to verify possession by the second station of the first shared secret;
   sending a second message carrying intermediate data key (n) encrypted using a hashed version of a second shared secret; and
   if the second station sends a response to the second message, carrying a hashed version of intermediate data key (n) encrypted using a hashed version of the second shared secret, after possession by the first station of the second shared secret is verified at the second station, the verifying being accomplished at the second station by decrypting the intermediate data key (n) from the second message using the hashed version of the second shared secret, calculating a hashed version of the intermediate data key (n), and matching the calculated hashed version and the decrypted hashed version of intermediate data key (n) to verify possession by the first station of the second shared secret, then
   receiving the response from the second station, and decrypting the hashed version of the intermediate data key (n) using the hashed version of the second shared secret, calculating a hashed version of intermediate data key (n) at the first station, and matching the calculated hashed version and the decrypted hashed version of intermediate data key (n) at the first station to verify mutual authentication of the first and second stations; and
   if mutual authentication is verified at the first station, then sending a message indicating successful authentication: wherein the session key lifetimes have respective lengths which are longer than said session key initiation intervals, and less than a multiple M times a time required for verification of mutual authentication using said first and second sets of exchanges in expected circumstances, where M is less than or equal to 10.

9. The apparatus of claim 8, including logic to use said associated session key in response to another request to initiate a communication session from a third station received by the first station during said particular session key initiation interval, and using other session keys from the set of ephemeral session keys after expiry of said particular session key initiation interval.

10. The apparatus of claim 9, including logic to associate a unique set of intermediate data keys with each session key.

11. The apparatus of claim 8, including a buffer at the first station;

logic to store the set of ephemeral session keys in the buffer and to remove session keys in said set of ephemeral session keys from said buffer after expiry of the respective session key lifetimes.

12. The apparatus of claim 11, wherein the session key lifetimes have respective lengths longer or equal to a time required for verification of mutual authentication using said first and second sets of exchanges.

13. The apparatus of claim 8, wherein said message indicating successful authentication carries a signal encrypted using intermediate data key (n−1) or using another prearranged one of said intermediate data keys (i).

14. The apparatus of claim 8, including using intermediate data key (n) as a symmetrical key to encrypt data during post-authentication communications between the first and second stations in the communication session.

* * * * *

UNITED STATES PATENT AND TRADEMARK OFFICE
CERTIFICATE OF CORRECTION

PATENT NO.       : 7,581,100 B2
APPLICATION NO.  : 10/653503
DATED            : August 25, 2009
INVENTOR(S)      : Len L. Mizrah It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1101 days.

Signed and Sealed this

Fourteenth Day of September, 2010

David J. Kappos
*Director of the United States Patent and Trademark Office*